United States Patent
Cheon et al.

(10) Patent No.: US 12,189,380 B2
(45) Date of Patent: Jan. 7, 2025

(54) DIAGNOSTIC TOOL TO TOOL MATCHING AND COMPARATIVE DRILL-DOWN ANALYSIS METHODS FOR MANUFACTURING EQUIPMENT

(71) Applicant: Applied Materials, Inc., Santa Clara, CA (US)

(72) Inventors: Sejune Cheon, Seoul (KR); Jeong Jin Hong, Yongin (KR); Mikyung Shim, Seongnam (KR); Xiaoqun Zou, Danville, CA (US); Jinkyeong Lee, Seoul (KR); Sang Hong Kim, Seoul (KR)

(73) Assignee: Applied Materials, Inc., Santa Clara, CA (US)

( * ) Notice: Subject to any disclaimer, the term of this patent is extended or adjusted under 35 U.S.C. 154(b) by 319 days.

(21) Appl. No.: 17/586,701

(22) Filed: Jan. 27, 2022

(65) Prior Publication Data
US 2023/0259112 A1 Aug. 17, 2023

(51) Int. Cl.
G05B 23/02 (2006.01)

(52) U.S. Cl.
CPC ..... G05B 23/0254 (2013.01); G05B 23/0283 (2013.01)

(58) Field of Classification Search
CPC .......... G05B 23/0254; G05B 23/0283
USPC ........................................ 700/29
See application file for complete search history.

(56) References Cited

U.S. PATENT DOCUMENTS

| | | |
|---|---|---|
| 8,285,414 B2 | 10/2012 | Aharoni et al. |
| 10,518,411 B2 | 12/2019 | Gilman |
| 10,705,514 B2 | 7/2020 | Banna |
| 11,120,127 B2 | 9/2021 | Niculescu-Mizil et al. |
| 11,501,239 B2 | 11/2022 | Cmielowski |
| 2003/0139908 A1 | 7/2003 | Wegerich |
| 2003/0229464 A1 | 12/2003 | Takanabe |
| 2004/0028267 A1 | 2/2004 | Shoham |
| 2005/0010318 A1 | 1/2005 | Lev-Ami |
| 2005/0159911 A1* | 7/2005 | Funk ............ G05B 19/418 700/121 |
| 2006/0273266 A1 | 12/2006 | Preil |

(Continued)

FOREIGN PATENT DOCUMENTS

KR 20170035806 A 3/2017

OTHER PUBLICATIONS

Lee, K.B. et al. "A Convolutional Neural Network for Fault Classification and Diagnosis in Semiconductor Manufacturing Processes"; IEEE Transactions on Semiconductor Manufacturing, May 2017, pp. 135-142, vol. 30, No. 2.

(Continued)

*Primary Examiner* — Jigneshkumar C Patel
(74) *Attorney, Agent, or Firm* — Lowenstein Sandler LLP

(57) ABSTRACT

A method includes receiving first data associated with measurements taken by a sensor during a first manufacturing procedure of a manufacturing chamber. The method further includes receiving second data. The second data includes reference data associated with the first data. The method further includes providing the first and second data to a comparison model. The method further includes receiving a similarity score from the comparison model, associated with the first and second data. The method further includes performance of a corrective action in view of the similarity score.

17 Claims, 12 Drawing Sheets

(56) References Cited

U.S. PATENT DOCUMENTS

| | | |
|---|---|---|
| 2007/0288409 A1 | 12/2007 | Mukherjee |
| 2009/0182529 A1 | 7/2009 | Zangooie |
| 2013/0323127 A1 | 12/2013 | Loutfi |
| 2014/0107828 A1 | 4/2014 | Zhu |
| 2014/0311245 A1 | 10/2014 | Horoshenkov |
| 2015/0308627 A1 | 10/2015 | Hoskins |
| 2016/0203036 A1 | 7/2016 | Mezic |
| 2017/0098565 A1 | 4/2017 | Lu |
| 2018/0217508 A1* | 8/2018 | Urbanczyk ......... G03F 7/70633 |
| 2019/0198405 A1 | 6/2019 | Li |
| 2019/0384257 A1 | 12/2019 | Zhang |
| 2020/0082245 A1 | 3/2020 | Hao et al. |
| 2020/0097808 A1* | 3/2020 | Thomas ............... G06Q 10/063 |
| 2020/0110341 A1 | 4/2020 | Mossavat |
| 2020/0200035 A1* | 6/2020 | Nair ....................... G01M 15/14 |
| 2020/0243359 A1 | 7/2020 | Hao et al. |
| 2020/0264335 A1 | 8/2020 | Bhatia et al. |
| 2020/0379454 A1 | 12/2020 | Trinh et al. |
| 2021/0042570 A1 | 2/2021 | Iskandar et al. |
| 2021/0066141 A1 | 3/2021 | Phan |
| 2021/0074526 A1 | 3/2021 | Dhekial-Phukan et al. |
| 2021/0103489 A1 | 4/2021 | Burch et al. |
| 2021/0116896 A1 | 4/2021 | Arabshahi et al. |
| 2021/0407866 A1* | 12/2021 | Huang ............... G05B 19/4184 |
| 2023/0120761 A1 | 4/2023 | Krause et al. |
| 2023/0245872 A1 | 8/2023 | Daly |
| 2023/0400847 A1 | 12/2023 | Guo et al. |

OTHER PUBLICATIONS

International Search Report and Written Opinion of International application No. PCT/US2023/011547 mailed May 3, 2023; 10 pages.

International Search Report and Written Opinion of International application No. PCT/US2023/011550 mailed May 22, 2023; 10 pages.

International Search Report and Written Opinion of International application No. PCT/US2023/011552 mailed May 2, 2023; 10 pages.

Jang, J. et al. "Denoised Residual Trace Analysis for Monitoring Semiconductor Process Faults"; IEEE Transactions on Semiconductor Manufacturing, Aug. 2019, pp. 293-301; vol. 32, No. 3.

Kameswari, U. Surya et al., "Sensor Data Analysis and Anomaly Detection using Predictive Analytics for Process Industries"; 2015 IEEE Workshop on Computational Intelligence: Theories, Applications and Future Directions (WCI), Dec. 14, 2015, pp. 1-8, IEEE.

* cited by examiner

DIAGNOSTIC TOOL TO TOOL MATCHING AND COMPARATIVE DRILL-DOWN ANALYSIS METHODS FOR MANUFACTURING EQUIPMENT

RELATED APPLICATIONS

This patent application is related to U.S. patent application Ser. No. 17/586,700 filed Jan. 27, 2022 titled "DIAGNOSTIC TOOL TO TOOL MATCHING METHODS FOR MANUFACTURING EQUIPMENT," and is also related to U.S. patent application Ser. No. 17/586,702 filed Jan. 27, 2022 titled "DIAGNOSTIC TOOL TO TOOL MATCHING AND FULL-TRACE DRILL-DOWN ANALYSIS METHODS FOR MANUFACTURING EQUIPMENT," both of which are incorporated by reference herein.

TECHNICAL FIELD

The present disclosure relates to diagnostic methods for determining faults in manufacturing equipment, and in some embodiments, tool to tool matching methods with drill-down analysis using comparative models for determining faults in manufacturing equipment.

BACKGROUND

Products may be produced by performing one or more manufacturing processes using manufacturing equipment. For example, semiconductor manufacturing equipment may be used to produce substrates via semiconductor manufacturing processes. Products are to be produced with particular properties, suited for a target application. Understanding and controlling properties within the manufacturing chamber aids in consistent production of products.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In an aspect of the disclosure, a method includes receiving first data associated with measurements taken by a sensor during a first manufacturing procedure of a manufacturing chamber. The method further includes receiving second data, wherein the second data includes reference data associated with the first data. The method further includes providing the first data and the second data to a comparison model. The method further includes receiving from the comparison model a similarity score associated with the first data and the second data. The method further includes causing performance of a corrective action in view of the similarity score.

In another aspect of the disclosure, a system comprising memory and a processing device coupled to the memory is disclosed. The processing device is configured to receive first data associated with measurements taken by a sensor during a first manufacturing process of a manufacturing chamber. The processing device is further configured to receive second data, the second data including reference data associated with the first data. The processing device is further configured to provide the first data and the second data to the comparison model. The processing device is further configured to receive from the comparison model a similarity score associated with the first data and the second data. The processing device is further configured to cause performance of a corrective action in view of the similarity score.

In another aspect of the disclosure, a non-transitory machine-readable storage medium is enabled. The medium stores instructions which, when executed, cause a processing device to perform operations including receiving first data associated with measurements taken by a sensor during a first manufacturing procedure of a manufacturing chamber. The operations further include receiving second data, the second data including reference data associated with the first data. The operations further include providing the first data and the second data to a comparison model. The operations further include receiving a similarity score form the comparison model, the similarity score associated with the first data and the second data. The operations further include causing performance of a corrective action in view of the similarity score.

BRIEF DESCRIPTION OF THE DRAWINGS

The present disclosure is illustrated by way of example, and not by way of limitation in the figures of the accompanying drawings.

DETAILED DESCRIPTION

Figure 1:
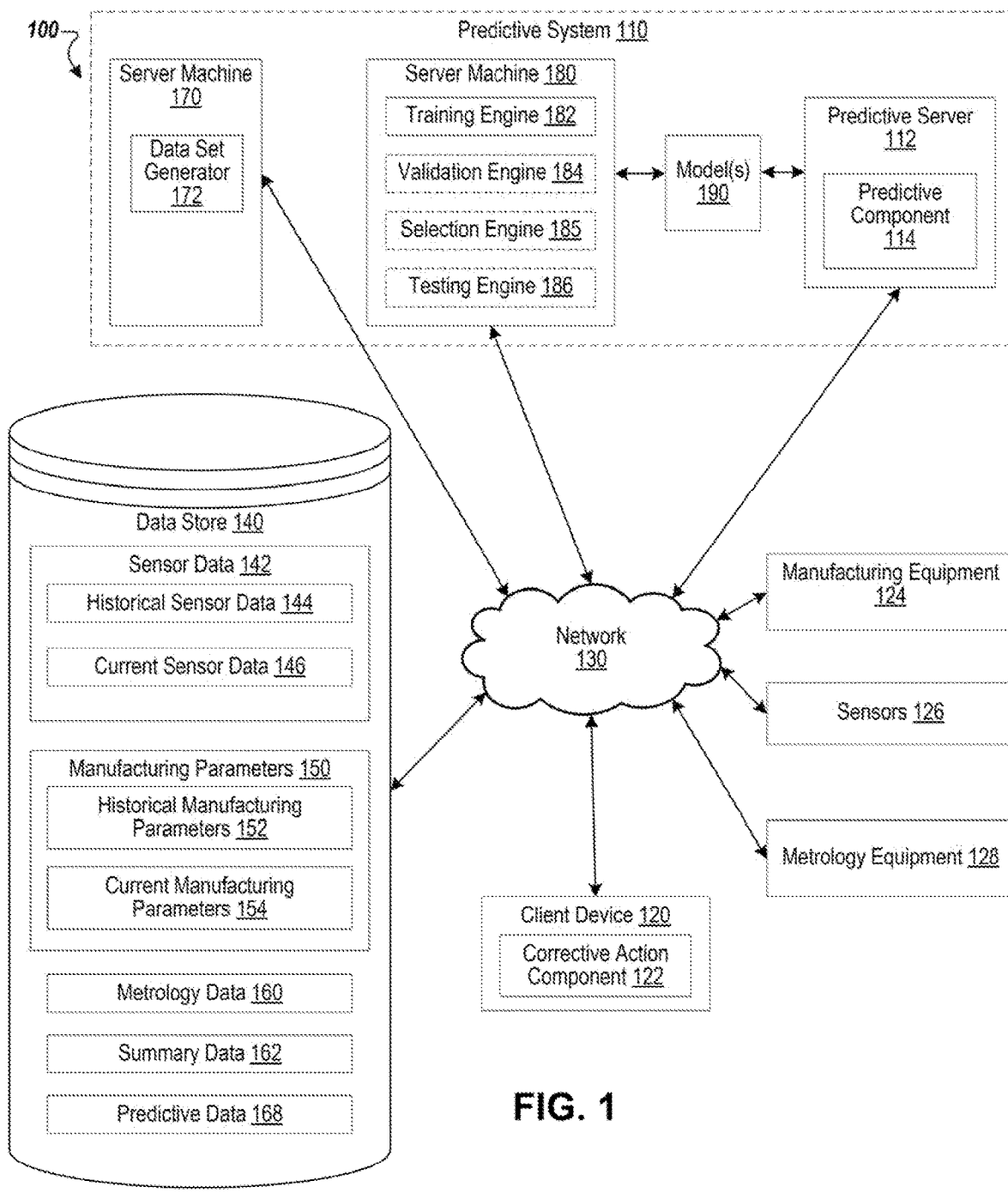
FIG. 1 is a block diagram illustrating an exemplary system architecture, according to some embodiments.

Described herein are technologies related to tool to tool matching (TTTM) diagnostic methods, which may be used for diagnosing problems in manufacturing equipment and/or for performance of a corrective action. Manufacturing equipment may be used to produce products, such as substrates (e.g., wafers, semiconductors, displays, photovoltaics, etc.). Manufacturing equipment (e.g., manufacturing tools) often includes a manufacturing chamber that separates the substrate being processed from the environment. The properties of produced substrates are to meet target property values to facilitate performance, functionality, etc. Manufacturing parameters are selected to produce substrates that meet target property values. Manufacturing parameters may include process parameters, such as temperature, gas flow, plasma conditions, pressure, etc., and hardware parameters, such as component use, component settings, component positions, etc. Manufacturing systems control such parameters by specifying a set point for a property value and receiving data from one or more sensors disposed within the manufacturing chamber. The manufacturing system makes adjustments to the set points of various components until sensor readings match set points (within a tolerance threshold).

A manufacturing system can exhibit or develop properties that result in sub-optimal performance, for example due to components drifting, aging or failing, improperly performed maintenance, changes to target process parameters, etc. Sensor data collected during a manufacturing process may carry information indicative of drifting, aging, malfunctioning, or failing subsystems and/or components. A manufacturing system may include a large number of sensors, in some systems dozens or even hundreds to thousands of sensors. In some systems, sensors may collect data over time (e.g., trace data) during a manufacturing procedure. A single time trace (e.g., associated with one sensor and one processing run, or one product manufactured) may include hundreds of data points, thousands of data points, or more.

Ensuring conditions are consistent, e.g., from run to run in a single chamber, consistent between chambers, etc., may increase consistency, performance, quality, etc., of produced products. Tool to tool matching (TTTM) is a process directed at ensuring consistency. In some cases, sensor data is used as a measure of processing conditions. In conventional systems, utilizing sensor data for diagnosis and corrective actions may be inconvenient. In some systems, sensor data may be used to identify a root cause of sub-optimal performance of a tool. Sub-optimal performance may be detected by performing measurements on completed products, e.g., via random quality control, sparse sampling, etc. Responsive to measurement of sub-optimal performance (e.g., products outside manufacturing tolerances), sensor data of a tool may be investigated. Sensor data may be utilized to identify a subsystem, component, etc., of the tool that is aging, drifting, failing, malfunctioning, etc., contributing to sub-optimal performance of the tool. Identifying sensor data of interest may include comparing trace data from many different processing operations and many different sensors, and may include comparisons with historical data as well as current data. It can be cumbersome to isolate sensor data indicative of a corrective action when such a large amount of sensor data is available. This system of analysis can be wasteful in terms of time expended, computer processing time and associated energy costs, and the danger of finding some information but missing other indicative sensor data due to stopping cumbersome analysis after finding a number of components to perform maintenance on, replace, or the like.

In some systems, investigations into sensor data may be triggered by sub-optimal performance, e.g., by one or more products being produced with properties outside of manufacturing specifications. In some cases, only a subset of products undergo performance measurements, e.g., metrology measurements to ascertain production quality. Performance measurements (e.g., metrology) may be costly, e.g., may take a significant amount of time to generate. Manufacturing equipment may continue to be used to produce products while metrology is performed on previous products and/or while previous products are in queue for metrology measurements. In cases where manufacturing equipment has degenerated (e.g., changed such that performance of the equipment is sub-optimal, such as due to components aging, drifting, failing, etc.), metrology measurements of products may not be performed until after a number of products have been processed using the sub-optimal equipment. As a result sub-optimal products may be manufactured. Such a system is wasteful in terms of wasted time processing sub-optimal products, energy expended, materials expended, etc.

In conventional systems, the difficulties in isolating informative sensor data (e.g., identifying from a large amount of sensor data, data indicating a corrective action to be performed in association with manufacturing equipment) results in a metrology-based fault detection. In some cases, sensor data may be affected in an observable way by drifting, aging, or failing components earlier than metrology is observably affected. In such a case, sensor data may be used to schedule the corrective action to coincide with planned downtime (e.g., a preventative maintenance operation) before metrology is affected, reducing expensive unscheduled downtime for the manufacturing system. If sensor data cannot be reliably used, corrective actions may be performed responsive to sub-optimal metrology data and may result in unscheduled downtime. In some embodiments unscheduled downtime may incur additional costs, such as express shipping for replacement components, etc.

The methods and devices of the present disclosure address at least one or more of the above described deficiencies in conventional solutions. In some embodiments, summary data is enabled and generated that allows quick processing time and a reduction in communication bandwidth, complexity of analyzing full trace data, etc. Generating summary data may include application of statistical methods, machine learning methods, digital twin methods, etc., to trace data (e.g., trace sensor data).

One or more metrics (e.g., standards of measurement) may be utilized to indicate system health of manufacturing equipment. In some embodiments, summary data may be utilized to generate one or more metric values. A metric value may be used as an indication that further investigations are to be implemented, associated with a chamber, a process, a product, a component, etc. In some embodiments, a metric value (e.g., an index, a quality score, a quality index score, etc.) may be calculated that indicates no observable problems exist. In some embodiments, a tool to tool matching (TTTM) index may be generated to enable efficient isolation of problematic systems, tools, products, components, or the like. Metric values and indices may be aggregated in a variety of ways to assist in drill-down analysis—e.g., the process of increasing understanding of a tool, from identification that a problem exists to identification of a corrective action to be taken. For example, a metric may be utilized that is related to a large (e.g., more than historical) number of outliers in sensor data (e.g., as reflected by summary data). In some embodiments, a metric value meeting a threshold value may trigger further analysis, including the generation of another metric value associated with a different metric. In some embodiments, a series of metrics may be utilized as part of drill-down analysis. For example, a first metric value (e.g., index) may indicate that a manufacturing chamber is performing sub-optimally, a further index may be aggregated indicating the performance is due to one subsystem, a further index may be generated indicating a processing operation in which the decreased performance occurs, etc.

In some embodiments, data (e.g., summary data) may be provided to one or more models (e.g., machine learning models) to identify root causes, subsystems, corrective actions to be taken, etc. In some embodiments, data at any stage of drill-down analysis may be visualized and displayed via a graphical interface.

In some embodiments (e.g., in response to one or more metric values or indices indicating sub-optimal performance), analysis utilizing trace sensor data may be performed. Trace data may be provided to a machine learning model. The machine learning model may be trained to identify root causes, identify problematic subsystems, identify corrective actions to be performed, etc. Trace data analysis may be displayed via a graphical interface.

Aspects of the present disclosure result in technological advantages compared to conventional solutions. The present disclosure results in a more efficient substrate manufacturing process with minimized waste. If a problem arises in a manufacturing chamber, methods of the present disclosure may be able to cause performance of a corrective action before processing of the next product has begun, before a sub-optimal product is submitted for quality measurements, before quality measurements are completed, etc. In this way, wasted material, manufacturing chamber time, and energy supplied to the manufacturing process can be minimized. Product quality may increase, as root causes of variations in product quality and chamber drift may be identified and corrected. The efficiency of producing products of acceptable quality may also increase, as the process parameters can be tuned more precisely, improving cost of materials, energy, and time. Aging components may be identified and flagged for replacement or maintenance, reducing unscheduled down time, costs associated with express shipping replacement parts, and the like.

In some embodiments, the present disclosure describes a method including receiving trace sensor data associated with a first manufacturing process of a manufacturing chamber. The method further includes processing the trace sensor data by a processing device to generate summary data associated with the trace sensor data. The method further includes generating a quality index score based on the summary data. The method further includes providing an alert to a user based on the quality index score. The alert includes an indication that the manufacturing chamber performance does not meet a first threshold.

In some embodiments, the present disclosure describes a method including receiving first data associated with measurements taken by a sensor during a first manufacturing procedure of a manufacturing chamber. The method further includes receiving second data, wherein the second data includes reference data associated with the first data. The method further includes providing the first data and the second data to a comparison model. The method further includes receiving from the comparison model a similarity score associated with the first data and the second data. The method further includes causing performance of a corrective action in view of the similarity score.

In some embodiments, the present disclosure describes a method including receiving trace sensor data associated with a first manufacturing process of a processing chamber. The method further includes processing the trace sensor data using one or more trained machine learning models that generate a representation of the trace sensor data and then generate reconstructed sensor data based on the representation of the trace sensor data. The one or more trained machine learning models output the reconstructed sensor data. The method further includes comparing the trace sensor data to the reconstructed sensor data. The method further includes determining one or more differences between the reconstructed sensor data and the trace sensor data based on the comparing. The method further includes determining whether to recommend a corrective action associated with the processing chamber based on the one or more differences between the trace sensor data and the reconstructed sensor data.

FIG. 1 is a block diagram illustrating an exemplary system 100 (exemplary system architecture), according to some embodiments. System 100 includes a client device 120, manufacturing equipment 124, sensors 126, metrology equipment 128, a predictive server 112, and a data store 140. Predictive server 112 may be part of a predictive system 110. Predictive system 110 may further include server machines 170 and 180.

Sensors 126 may provide sensor data 142 associated with manufacturing equipment 124 (e.g., associated with producing, by manufacturing equipment 124, corresponding products, such as substrates). Sensor data 142 may be used for equipment health and/or product health (e.g., product quality). The manufacturing equipment 124 may produce products following a recipe or performing runs over a period of time. In some embodiments, the sensor data 142 may include values of one or more of temperature (e.g., heater temperature), spacing (SP), pressure, High Frequency Radio Frequency (HFRF), radio frequency (RF) match voltage, RF match current, RF match capacitor position, voltage of Electrostatic Chuck (ESC), actuator position, electrical current, flow, power, voltage, etc. Sensor data 142 may be associated with or indicative of manufacturing parameters such as hardware parameters (e.g., settings or components, e.g., size, type, etc.) of manufacturing equipment 124 or process parameters of manufacturing equipment 124. Data associated with some hardware parameters may, instead or additionally, be stored as manufacturing parameters 150, which may include historical manufacturing parameters 152 and current manufacturing parameters 154. Manufacturing parameters 150 may be indicative of input settings to the manufacturing device (e.g., heater power, gas flow, etc.). The sensor data 142 and/or manufacturing parameters 150 may be provided while the manufacturing equipment 124 is performing manufacturing processes (e.g., may be equipment readings generated during processing of products). The sensor data 142 may be different for each product (e.g., each substrate). Substrates may have property values (e.g., film thickness, film strain, etc.) measured by metrology equipment 128. Metrology data 160 may be a type of data stored in data store 140.

In some embodiments, sensor data 142, metrology data 160, and/or manufacturing parameters 150 may be processed (e.g., by the client device 120 and/or by the predictive server 112). Processing of the sensor data 142, metrology data 160, and/or manufacturing parameters 150 may include generating features. In some embodiments, the features are a pattern in the sensor data 142, metrology data 160, and/or manufacturing parameters 150 (e.g., slope, width, height, peak, etc.) or a combination of values from the sensor data 142, metrology data 160, and/or manufacturing parameters 150 (e.g., power derived from voltage and current, etc.). The sensor data 142 may include features and the features may be used by the predictive component 114 for performing signal processing and/or for obtaining predictive data 168 for performance of a corrective action.

Each instance (e.g., set) of sensor data 142 may correspond to a product (e.g., a substrate), a set of manufacturing equipment, a type of substrate produced by manufacturing equipment, or the like. Each instance of metrology data 160 and manufacturing parameters 150 may likewise correspond to a product, a set of manufacturing equipment, a type of substrate produced by manufacturing equipment, or the like. The data store may further store information associating sets of different data types, e.g. information indicative that a set of sensor data, a set of metrology data, and a set of manufacturing parameters are all associated with the same product, manufacturing equipment, type of substrate, etc.

In some embodiments, data associated with processing of one or more products may be used to generate summary data 162. Summary data 162 may include data that represents features of other data. For example, summary data 162 may be generated from trace sensor data 142. Trace sensor data 142 may include a large amount of data (e.g., data from hundreds of sensors in a tool, each taking hundreds or thousands of measurements per product, etc.). Summary data 162 may be less cumbersome to manipulate than trace sensor data 142, and may be designed in a way that information (e.g., information indicative of a chamber fault) may be preserved. In some embodiments, data (e.g., trace sensor data 142) may be provided to a processing device (e.g., predictive server 112, client device 120, etc.) to generate summary data 162. Summary data 162 may include, for example, metadata (e.g., tool ID, recipe name, product ID, product information, etc.), context data (e.g., sensor ID, step number, time stamp, subsystem, etc.), and/or basic statistics (e.g., mean, maximum, minimum, quartiles, kurtosis, control limits, etc.). In some embodiments, generation of summary data 162 may include use of a digital twin model of one or more components of manufacturing equipment 124. As used herein, a digital twin is a digital replica of a physical asset, such as a manufactured part, chamber component or process chamber. The digital twin includes characteristics of the physical asset, including (but not limited to) coordinate axis dimensions, weight characteristics, material characteristics (e.g., density, surface roughness), electrical characteristics (e.g., conductivity), optical characteristics (e.g., reflectivity), etc. In some embodiments, a digital twin model may be used to generate predictions of the time behavior of data, e.g., sensor data 142. Summary data 162 may include indications of how features of the measured data differ from the predictions of the digital twin model (e.g., overshoot, rise time, settle time, steady state value error, etc.). In some embodiments, summary data 162 may be generated based on part of the input data, e.g., only a steady state portion, only a transient portion, etc. of the summary data 162. Summary data 162 will be described in more detail in connection with FIG. 5B.

In some embodiments, predictive system 110 may generate predictive data 168 using machine learning, such as supervised machine learning (e.g., a machine learning model may be configured to produce labels associated with input data, such as metrology predictions, performance predictions, etc.). In some embodiments, predictive system 110 may generate predictive data 168 using unsupervised machine learning (e.g., a machine learning model may be trained with unlabeled data, such as a model configured to perform clustering, dimensional reduction, etc.). In some embodiments, predictive system 110 may generate predictive data 168 using semi-supervised learning (e.g., a machine learning model may be trained using both labeled and unlabeled input data sets).

Client device 120, manufacturing equipment 124, sensors 126, metrology equipment 128, predictive server 112, data store 140, server machine 170, and/or server machine 180 may be coupled to each other via network 130 for generating predictive data 168 to perform corrective actions.

In some embodiments, network 130 is a public network that provides client device 120 with access to the predictive server 112, data store 140, and other publicly available computing devices. In some embodiments, network 130 is a private network that provides client device 120 access to manufacturing equipment 124, sensors 126, metrology equipment 128, data store 140, and other privately available computing devices. In some embodiments, the functions of one or more of server machine 170, server machine 180, and/or predictive server 112 may be performed by a virtual machine, e.g., utilizing a cloud-based service. Network 130 may provide access to such virtual machines. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

Client device 120 may include a computing device such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. The client device 120 may include a corrective action component 122. Corrective action component 122 may receive user input (e.g., via a Graphical User Interface (GUI) displayed via the client device 120) of an indication associated with manufacturing equipment 124. In some embodiments, corrective action component 122 transmits the indication to predictive system 110, receives an output (e.g., predictive data 168) from predictive system 110, determines a corrective action based on the output, and causes the corrective action to be implemented. In some embodiments, corrective action component 122 obtains sensor data 142 (e.g., current sensor data 146) associated with the manufacturing equipment 124 (e.g., from data store 140, etc.) and provides sensor data 142 (e.g., current sensor data 146) associated with manufacturing equipment 124 to predictive system 110. In some embodiments, corrective action component 122 stores sensor data 142 in data store 140 and predictive server 112 retrieves sensor data 142 from data store 140. In some embodiments, predictive server 112 may store an output (e.g., predictive data 168) of the trained model(s) 190 in data store 140 and client device 120 may retrieve the output from data store 140. In some embodiments, corrective action component 122 receives an indication of a corrective action from predictive system 110 and causes the corrective action to be implemented. Each client device 120 may include an operating system that allows users to one or more of generate, view, or edit data (e.g., an indication associated with manufacturing equipment 124, corrective actions associated with manufacturing equipment 124, etc.).

In some embodiments, metrology data 160 corresponds to historical property data of products (e.g., produced using manufacturing parameters associated with historical sensor data 144 and historical manufacturing parameters 152) and predictive data 168 is associated with predicted property data (e.g., predicted data of products to be produced or that have been produced in conditions recorded by current sensor data 146 and/or current manufacturing parameters 154). In some embodiments, predictive data 168 is predicted metrology data (e.g., virtual metrology data) of the products to be produced or that have been produced according to conditions recorded as current sensor data 146 and/or current manufacturing parameters 154. In some embodiments, predictive data 168 is an indication of abnormalities (e.g., abnormal products, abnormal components, abnormal manufacturing equipment 124, abnormal energy usage, etc.) and optionally one or more causes of the abnormalities. In some embodiments, predictive data 168 is an indication of change over time or drift in some component of manufacturing equipment 124, sensors 126, metrology equipment 128, and the like. In some embodiments, predictive data 168 is an indication of an end of life of a component of manufacturing equipment 124, sensors 126, metrology equipment 128, or the like.

Performing manufacturing processes that result in defective products can be costly in time, energy, products, components, manufacturing equipment 124, the cost of identifying the defects and discarding the defective product, etc. By inputting sensor data 142 (e.g., manufacturing parameters that are being used or are to be used to manufacture a product) into predictive system 110, receiving output of predictive data 168, and performing a corrective action based on the predictive data 168, system 100 can have the technical advantage of avoiding the cost of producing, identifying, and discarding defective products.

Performing manufacturing processes that result in failure of the components of the manufacturing equipment 124 can be costly in downtime, damage to products, damage to equipment, express ordering replacement components, etc. By inputting sensor data 142 (e.g., indicative of manufacturing parameters that are being used or are to be used to manufacture a product) into predictive system 110, receiving output of predictive data 168, and performing corrective action (e.g., predicted operational maintenance, such as replacement, processing, cleaning, etc. of components) based on the predictive data 168, system 100 can have the technical advantage of avoiding the cost of one or more of unexpected component failure, unscheduled downtime, productivity loss, unexpected equipment failure, product scrap, or the like. Monitoring the performance over time of components, e.g. manufacturing equipment 124, sensors 126, metrology equipment 128, and the like, may provide indications of degrading components.

Manufacturing parameters may be sub-optimal for producing product, which may have costly results of increased resource (e.g., energy, coolant, gases, etc.) consumption, increased amount of time to produce the products, increased component failure, increased amounts of defective products, etc. By inputting the sensor data 142 into the trained model 190, receiving an output of predictive data 168, and performing (e.g., based on the predictive data 168) a corrective action of updating manufacturing parameters (e.g., setting optimal manufacturing parameters), system 100 can have the technical advantage of using optimal manufacturing parameters (e.g., hardware parameters, process parameters, optimal design) and/or healthy equipment to avoid costly results of sub-optimal manufacturing parameters.

Corrective action may be associated with one or more of Computational Process Control (CPC), Statistical Process Control (SPC) (e.g., SPC on electronic components to determine process in control, SPC to predict useful lifespan of components, SPC to compare to a graph of 3-sigma, etc.), Advanced Process Control (APC), model-based process control, preventative operative maintenance, design optimization, updating of manufacturing parameters, updating manufacturing recipes, feedback control, machine learning modification, or the like.

In some embodiments, the corrective action includes providing an alert (e.g., an alarm to stop or not perform the manufacturing process on additional substrates if the predictive data 168 indicates a predicted abnormality, such as an abnormality of the product, a component, or manufacturing equipment 124). In some embodiments, the corrective action includes providing feedback control (e.g., modifying a manufacturing parameter responsive to the predictive data 168 indicating a predicted abnormality). In some embodiments, performance of the corrective action includes causing updates to one or more manufacturing parameters.

Manufacturing parameters may include hardware parameters (e.g., information indicating components included in the manufacturing equipment, indications of recently replaced components, indications of firmware versions or updates, etc.) and/or process parameters (e.g., temperature, pressure, flow rate, electrical current and/or voltage, gas flow, lift speed, etc.). In some embodiments, the corrective action includes causing preventative operative maintenance (e.g., to replace, process, clean, etc. components of the manufacturing equipment 124). In some embodiments, the corrective action includes causing design optimization (e.g., updating manufacturing parameters, updating manufacturing processes, updating manufacturing equipment 124, etc. for an optimized product). In some embodiments, the corrective action includes updating a recipe (e.g., altering timing of instructions for manufacturing equipment 124 to be in an idle mode, a sleep mode, a warm-up mode, etc., adjusting set points for temperature, gas flow, plasma generation, etc.).

Predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

Predictive server 112 may include a predictive component 114. In some embodiments, predictive component 114 may receive current sensor data 146, and/or current manufacturing parameters 154 (e.g., receive from the client device 120, retrieve from the data store 140) and generate output (e.g., predictive data 168) for performing corrective action associated with the manufacturing equipment 124 based on the current data. In some embodiments, the predictive component 114 may use one or more trained models 190 to determine the output for performing the corrective action based on current data.

In some embodiments, model 190 may include a trained physics-based digital twin model. The physics-based model may be capable of solving systems of equations describing physical phenomena that may occur in the manufacturing chamber, such as equations governing heat flow, energy balance, gas conductance, mass balance, fluid dynamics, electrical current flow, or the like. In some embodiments, the physics-based model performs calculations of gas conductance in the manufacturing chamber. Manufacturing parameters 150 may be provided to the trained physics-based model. The trained physics-based model may provide as output modeled property values indicative of conditions within the chamber, corresponding to sensors 126 disposed within the manufacturing chamber (e.g., manufacturing equipment 124). The output of the physics-based model may be stored in data store 140.

Predictive component 114 of predictive server 112 may receive summary data 162 generated from data collected by sensors 126. Predictive component 114 may utilize summary data 162 to generate predictive data 168. Predictive data 168 may include indications of fault, aging, drift, etc., in manufacturing equipment 124, sensors 126, etc. In some embodiments, summary data may be utilized to generate an index, e.g., a metric indicating health and/or performance of a tool, chamber, set of manufacturing equipment 124, etc. The index may be used for a corrective action, e.g., may be displayed on a GUI to a user, may cause performance of further analysis, etc. The index may indicate that further investigation into the source of the fault, aging, drift, etc., is to be performed. In some embodiments, the index may be generated by providing summary data to a trained machine learning model (e.g., model 190). In some embodiments, predictive component 114 may utilize summary data associated with an index indicating further investigation is to be done (e.g., summary data associated with an irregular index value) to isolate a subsystem related to tool performance. In some embodiments, summary data associated with an index indicating further investigation is to be done is used by predictive component 114 to perform analysis indicating unexpected drift of sensor data. In some embodiments, trace data associated with an index indicating further investigation is to be done may be utilized to isolate a subsystem contributing to tool performance. Further discussion of methods related to generating summary data, generating an index, and drill-down analysis is provided in connection with FIGS. 5A-G.

Historical sensor data 144 and historical manufacturing parameters 152 may be used to train one or more models 190, including physics-based models, digital twin models, machine learning models, etc. In some embodiments, a digital twin model may be used to generate summary data. The digital twin model may be generated from physical principles. In some embodiments, a digital twin model as generated may not capture some complexities of a manufacturing system, e.g., parts may be manufactured slightly differently (e.g., within the range of manufacturing tolerances), parts may have aged or drifted, etc. Historical data may be used to refine a physics-based or digital twin model for increased accuracy. Historical data may also be used to train one or more machine learning models. In some embodiments, machine learning models may be utilized to generate an index, to generate visualizations of data, to generate predictions of metrology data of finished products, etc.

In some embodiments, sensor data 142 may include data collected from sensors 126 during a manufacturing run that produced an acceptable product (e.g., as measured by metrology equipment 128). A manufacturing run that produces an acceptable product may be referred to as a golden run. Sensor data associated with such a manufacturing run may be stored in data store 140 as a part of historical sensor data 144. Predictive component 114 of predictive server 112 may compare golden run sensor data, current sensor data 146, and expected sensor data (e.g., as output by the trained physics-based model) to determine if component failure, drift, or the like has occurred. In some embodiments, some or all of these operations may instead be performed by a different device, e.g., client device 120, server machine 170, server machine 180, etc.

In some embodiments, predictive component 114 may determine which components contribute to differences between expected sensor data (e.g., historical sensor data, sensor data from a different tool, sensor data reflecting manufacturing parameters, etc.), current sensor data 146, and/or golden run sensor data. This may be performed, for example, by an examination (e.g., by a machine learning model, by a statistical model, etc.) of historical data of systems performing as-intended and systems exhibiting sub-optimal performance. Labeling sensor trace data with an indication of the cause of a fault (e.g., a subsystem responsible for sub-optimal performance) may enable a processing device to connect sensor differences (e.g., a particular pattern or feature in data from a particular sensor) to faults. Processing logic may be configured to connect certain features or patterns in sensor data to certain types of faults, certain components aging, drifting, or failing, etc. Sensors may be assigned a metric value indicating performance, e.g., a metric value aggregating the likelihood that a sensor indicates a fault over a number of operations or runs. Sensor data may be grouped into subsystems. Sensor metric values or indices may be aggregated into subsystem metric values or indices. Aggregated subsystem values (e.g., metric values, indices, etc.) may be used in identifying subsystem performance, etc.

Machine learning models (e.g., one or more models of models 190) may be trained using historical sensor data 144, historical manufacturing parameters 152, metrology data 160 corresponding to the runs where historical sensor data 144 was measured, etc. One type of machine learning model that may be used to perform some or all of the above tasks is an artificial neural network, such as a deep neural network. Artificial neural networks generally include a feature representation component with a classifier or regression layers that map features to a target output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Use of a physics-based digital twin model in connection with manufacturing equipment has significant technical advantages compared to operating manufacturing equipment without such a model. Multiple components (sensors, hardware, processing, etc.) may be tied together in a closed control loop. If there is a problem with any piece of equipment in a closed control loop, other components may adjust set points, etc., and readings may return to target values, yet the actual conditions inside the chamber may have changed. This leads to less consistent substrate production; loss of productivity; energy, time, and material inefficiencies; and can lead to premature component failure, increased maintenance costs, etc. In some embodiments, multiple data streams indicative of the same property may be monitored, to provide additional evidence of the root cause of a shift in sensor data, chamber conditions, or the like. In some embodiments, sensors indicative of chamber pressure are monitored. The sensors may include sensors measuring chamber pressure, actuator position of an actuator that affects chamber pressure, RF match voltage, RF match current, RF match capacitor position, etc. Some of these properties may be measured by more than one sensor. For example, the manufacturing chamber may be equipped with multiple pressure sensors, a subset of which are involved in a closed control loop, another subset of which are freely providing measurements of chamber conditions. A physics-based model may enable subtle changes, alterations, drifts, etc., in sensor readings, sensor performance, etc., to be captured and analyzed.

In some embodiments, predictive component 114 receives current sensor data 146 and/or current manufacturing parameters 154, performs signal processing to break down the current data into sets of current data, provides the sets of current data as input to a trained model 190, and obtains outputs indicative of predictive data 168 from the trained model 190. In some embodiments, predictive data 168 is indicative of metrology data 160 (e.g., prediction of substrate quality). In some embodiments, predictive data 168 is indicative of component health. In some embodiments, predictive data 168 is indicative of component performance.

In some embodiments, the various models discussed in connection with model 190 (e.g., physics-based digital twin model, predictive machine learning model, etc.) may be combined in one model (e.g., an ensemble model), or may be separate models. Predictive component 114 may receive current sensor data 146 and current manufacturing parameters 154, provide the data to a trained model 190, and receive information indicative of how much several components in the manufacturing chamber have drifted from their previous performance. Data may be passed between several distinct models included in model 190 and predictive component 114. In some embodiments, some or all of these operations may instead be performed by a different device, e.g., client device 120, server machine 170, server machine 180, etc. It will be understood by one of ordinary skill in the art that variations in data flow, which components perform which processes, which models are provided with which data, and the like are within the scope of this disclosure.

Data store 140 may be a memory (e.g., random access memory), a drive (e.g., a hard drive, a flash drive), a database system, or another type of component or device capable of storing data. Data store 140 may include multiple storage components (e.g., multiple drives or multiple databases) that may span multiple computing devices (e.g., multiple server computers). The data store 140 may store sensor data 142, manufacturing parameters 150, metrology data 160, summary data 162, and predictive data 168. Sensor data 142 may include historical sensor data 144 and current sensor data 146. Sensor data may include sensor data time traces over the duration of manufacturing processes, associations of data with physical sensors, pre-processed data, such as averages and composite data, and data indicative of sensor performance over time (i.e., many manufacturing processes). Manufacturing parameters 150 and metrology data 160 may contain similar features. Historical sensor data 144 and historical manufacturing parameters 152 may be historical data (e.g., at least a portion for training model 190). Current sensor data 146 may be current data (e.g., at least a portion to be input into learning model 190, subsequent to the historical data) for which predictive data 168 is to be generated (e.g., for performing corrective actions). Summary data 162 may include processed sensor data 142. Summary data may contain information indicative of corrective actions to be performed in association with manufacturing equipment 124. Summary data may be less intensive to manipulate than trace sensor data.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test model(s) 190, including a physics-based digital twin models, and in some embodiments one or more machine learning models. Some operations of data set generator 172 are described in detail below with respect to FIGS. 3, 4, and 5A. In some embodiments, the data set generator 172 may partition the historical data (e.g., historical sensor data 144, historical manufacturing parameters 152, summary data 162 stored in data store 140) into a training set (e.g., sixty percent of the historical data), a validating set (e.g., twenty percent of the historical data), and a testing set (e.g., twenty percent of the historical data). In some embodiments, predictive system 110 (e.g., via predictive component 114) generates multiple sets of features. For example a first set of features may correspond to a first set of types of sensor data (e.g., from a first set of sensors, first combination of values from first set of sensors, first patterns in the values from the first set of sensors) that correspond to each of the data sets (e.g., training set, validation set, and testing set) and a second set of features may correspond to a second set of types of sensor data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. An engine (e.g., training engine 182, a validation engine 184, selection engine 185, and a testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. Training engine 182 may be capable of training a model 190 using one or more sets of features associated with the training set from data set generator 172. Training engine 182 may generate multiple trained models 190, where each trained model 190 corresponds to a distinct set of features of the training set (e.g., sensor data from a distinct set of sensors). For example, a first trained model may have been trained using all features (e.g., X1-X5), a second trained model may have been trained using a first subset of the features (e.g., X1, X2, X4), and a third trained model may have been trained using a second subset of the features (e.g., X1, X3, X4, and X5) that may partially overlap the first subset of features. Data set generator 172 may receive the output of a trained model (e.g., a physics-based digital twin model, machine learning model), collect that data into training, validation, and testing data sets, and use the data sets to train a second model (e.g., a machine learning model configured to output predictive data, corrective actions, etc.).

Validation engine 184 may be capable of validating a trained model 190 using a corresponding set of features of the validation set from data set generator 172. For example, a first trained model 190 that was trained using a first set of features of the training set may be validated using the first set of features of the validation set. Validation engine 184 may determine an accuracy of each of the trained models 190 based on the corresponding sets of features of the validation set. Validation engine 184 may discard trained models 190 that have an accuracy that does not meet a threshold accuracy. In some embodiments, selection engine 185 may be capable of selecting one or more trained models 190 that have an accuracy that meets a threshold accuracy. In some embodiments, selection engine 185 may be capable of selecting the trained model 190 that has the highest accuracy of the trained models 190.

Testing engine 186 may be capable of testing a trained model 190 using a corresponding set of features of a testing set from data set generator 172. For example, a first trained model 190 that was trained using a first set of features of the training set may be tested using the first set of features of the testing set. Testing engine 186 may determine a trained model 190 that has the highest accuracy of all of the trained models based on the testing sets.

In the case of a machine learning model, model 190 may refer to the model artifact that is created by the training engine 182 using a training set that includes data inputs and corresponding target outputs (correct answers for respective training inputs). Patterns in the data sets can be found that map the data input to the target output (the correct answer), and the machine learning model 190 is provided mappings that captures these patterns. The machine learning model 190 may use one or more of a Support Vector Machine (SVM), a Radial Basis Function (RBF), clustering, supervised machine learning, semi-supervised machine learning, unsupervised machine learning, a k-Nearest Neighbor algorithm (k-NN), linear regression, a random forest, a neural network (e.g., artificial neural network), etc.

Predictive component 114 may provide current sensor data 146 and/or summary data 162 to model 190 and may run model 190 on the input to obtain one or more outputs. Predictive component 114 may be capable of determining (e.g., extracting) predictive data 168 from the output of model 190 and may determine (e.g., extract) confidence data from the output that indicates a level of confidence that the predictive data 168 is an accurate predictor of a process associated with the input data for products produced or to be produced using the manufacturing equipment 124 at the current sensor data 146 and/or current manufacturing parameters 154. Predictive component 114 or corrective action component 122 may use the confidence data to decide whether to cause a corrective action associated with the manufacturing equipment 124 based on the predictive data 168.

The confidence data may include or indicate a level of confidence that the predictive data 168 is an accurate prediction for products or components associated with at least a portion of the input data. In one example, the level of confidence is a real number between 0 and 1 inclusive, where 0 indicates no confidence that the predictive data 168 is an accurate prediction for products processed according to input data or component health of components of manufacturing equipment 124 and 1 indicates absolute confidence that the predictive data 168 accurately predicts properties of products processed according to input data or component health of components of manufacturing equipment 124. Responsive to the confidence data indicating a level of confidence below a threshold level for a predetermined number of instances (e.g., percentage of instances, frequency of instances, total number of instances, etc.) the predictive component 114 may cause the trained model 190 to be re-trained (e.g., based on current sensor data 146, current manufacturing parameters 154, etc.).

For purpose of illustration, rather than limitation, aspects of the disclosure describe the training of one or more machine learning models 190 using historical data (e.g., historical sensor data 144, historical manufacturing parameters 152) and inputting current data (e.g., current sensor data 146, current manufacturing parameters 154, etc.) into the one or more trained machine learning models to determine predictive data 168. In other embodiments, a heuristic model or rule-based model is used to determine predictive data 168 (e.g., without using a trained machine learning model). Predictive component 114 may monitor historical sensor data 144, historical manufacturing parameters 152, summary data 162, and metrology data 160. Any of the information described with respect to data inputs 310 of FIG. 3 may be monitored or otherwise used in the heuristic or rule-based model.

In some embodiments, the functions of client device 120, predictive server 112, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, client device 120 and predictive server 112 may be integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 may determine the corrective action based on the predictive data 168. In another example, client device 120 may determine the predictive data 168 based on output from a trained machine learning model, a physics-based model, etc.

In addition, the functions of a particular component can be performed by different or multiple components operating together. One or more of the predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Embodiments of the disclosure may be applied to data quality evaluation, feature enhancement, model evaluation, Virtual Metrology (VM), Predictive Maintenance (PdM), limit optimization, or the like.

Figure 2:
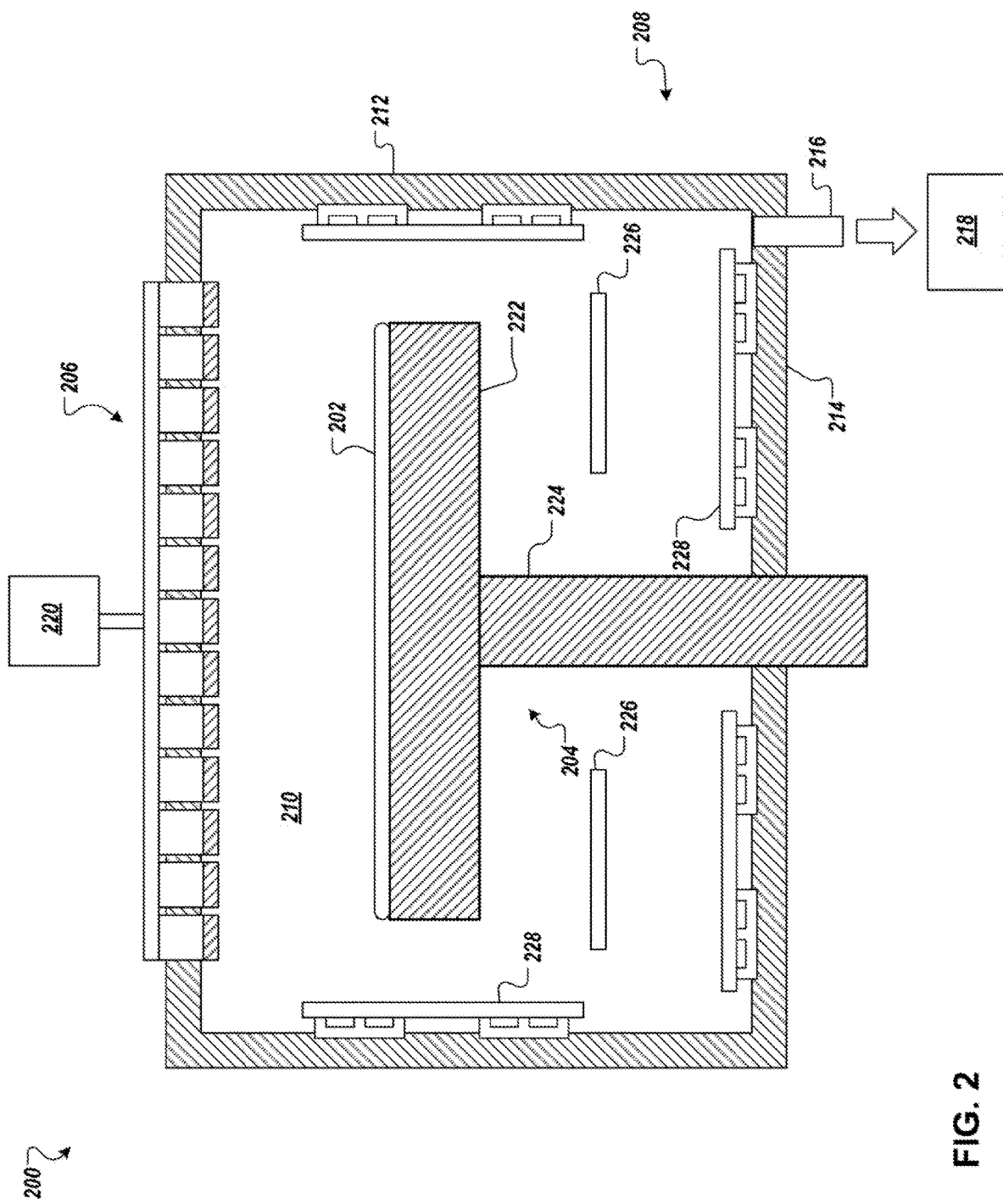
FIG. 2 depicts a sectional view of a manufacturing chamber, according to some embodiments.

FIG. 2 depicts a sectional view of a manufacturing chamber 200 (e.g., a semiconductor wafer manufacturing chamber) according to some aspects of this disclosure. Manufacturing chamber 200 may be one or more of an etch chamber (e.g., a plasma etch chamber), deposition chamber (including atomic layer deposition, chemical vapor deposition, physical vapor deposition, or plasma enhanced versions thereof), anneal chamber, or the like. For example, manufacturing chamber 200 may be a chamber for a plasma etcher, a plasma cleaner, and so forth. Examples of chamber components may include a substrate support assembly 204, an electrostatic chuck, a ring (e.g., a process kit ring), a chamber wall, a base, a showerhead 206, a gas distribution plate, a liner, a liner kit, a shield, a plasma screen, a flow equalizer, a cooling base, a chamber viewport, a chamber lid, a nozzle and so on.

In one embodiment, manufacturing chamber 200 includes a chamber body 208 and a showerhead 206 that enclose an interior volume 210. In some chambers, showerhead 206 may be replaced by a lid and a nozzle. Chamber body 208 may be constructed from aluminum, stainless steel, or other suitable material. Chamber body 208 generally includes sidewalls 212 and a bottom 214.

An exhaust port 216 may be defined in chamber body 208, and may couple interior volume 210 to a pump system 218. Pump system 218 may include one or more pumps and valves utilized to evacuate and regulate the pressure of interior volume 210 of manufacturing chamber 200. An actuator to control gas flow out the chamber and/or pressure in the chamber may be disposed at or near exhaust port 216.

Showerhead 206 may be supported on sidewalls 212 of chamber body 208 or on a top portion of the chamber body. Showerhead 206 (or the lid, in some embodiments) may be opened to allow access to interior volume 210 of manufacturing chamber 200, and may provide a seal for manufacturing chamber 200 while closed. Gas panel 220 may be coupled to manufacturing chamber 200 to provide process or cleaning gases to interior volume 210 through showerhead 206 (or lid and nozzle). Showerhead 206 may include multiple gas delivery holes throughout. Examples of processing gases that may be used to process substrates in manufacturing chamber 200 include halogen-containing gases, such as $C_2F_6$, $SF_6$, $SiCl_4$, HBr, $NF_3$, $CF_4$, $CHF_3$, $F_2$, $Cl_2$, $CCl_4$, $BCl_3$, and $SiF_4$, among others, and other gases such as $O_2$ or $N_2O$. Examples of carrier gases include $N_2$, He, Ar, and other gases inert to process gases (e.g., non-reactive gases).

Substrate support assembly 204 is disposed in interior volume 210 of manufacturing chamber 200 below showerhead 206. In some embodiments, substrate support assembly 204 includes a susceptor 222 and shaft 224. Substrate support assembly 204 supports a substrate during processing. In some embodiments, also disposed within manufacturing chamber 200 are one or more heaters 226 and reflectors 228.

Sensors are used to measure property values in manufacturing chamber 200. Sensors associated with manufacturing chamber 200 may include temperature sensors, pressure sensors (in some embodiments, at least two pressure sensors may be present), flow sensors, etc. In some embodiments, utilizing a physics-based digital twin model of manufacturing chamber 200, failing components can be identified and corrective actions taken.

In some embodiments, chamber 200 may include a number of sensors collecting time trace data. The time trace data may be transmitted to a data storage device (e.g., data store 140 of FIG. 1). Summary data may be generated from the time trace sensor data. Processing of the summary data and/or the time trace data may generate data indicative of a problematic (e.g., faulty, drifting, aging, etc.) chamber, subsystem, component, etc. Data processing may be performed by one or more models, including physics-based models, machine learning models, digital twin models, etc. Summary data may be used to generate an index. The value of the index may indicate performance of a tool, component, fleet, etc.

Figure 3:
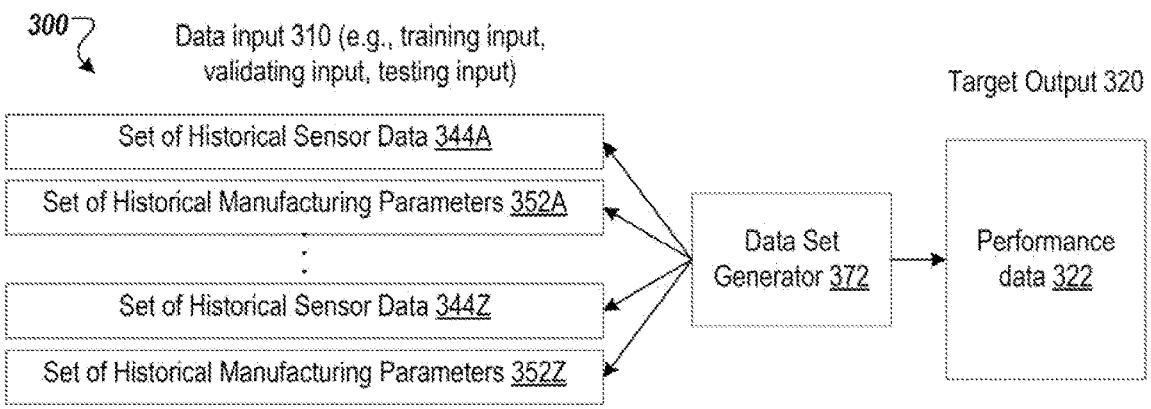
FIG. 3 is a depiction of a data set generator to create data sets for training, testing, and validating a model, according to some embodiments.

FIG. 3 is a depiction of a data set generator 372 (e.g., data set generator 172 of FIG. 1) to create data sets for training, testing, validating, etc. a model (e.g., model 190 of FIG. 1), according to some embodiments. Data set generator 372 may be part of server machine 170 of FIG. 1. In some embodiments, model 190 may include a number of machine learning models, physics-based models, digital twin models, etc. Each model may have its own data set generator, or multiple models may share a data set generator. Operations of one data set generator (associated with a model used to map sensor data to performance data) are described in connection with FIG. 3 in detail. Any of the other models may be associated with similar data set generation procedures. The input and output data may be different for other models than the input and output data described in connection with FIG. 3.

System 300 containing data set generator 372 (e.g., data set generator 172 of FIG. 1) creates data sets for a machine learning model (e.g., model 190 of FIG. 1). Data set generator 372 may create data sets (e.g., data input 310) using historical manufacturing parameters 352 (e.g., historical manufacturing parameters 152 of FIG. 1), historical sensor data, summary sensor data, etc. System 300 may be used to generate data sets to train, test, and validate a machine learning model. The machine learning model, in some embodiments, is provided with performance data 322 as target output 320. Performance data may be indicative of properties of a finished product, e.g., metrology data of a processed substrate. In some embodiments, performance data may be indicative of the condition of one or more components of the manufacturing equipment, e.g., failure, aging, drifting, recommended maintenance, etc. In some embodiments, data set generator 372 may be configured to generate data sets for a physics-based model of a component of manufacturing equipment. Output of the physics-based model may be refined by training the model using sensor data as target output. In some embodiments, sensor data associated with a successful process (e.g., golden run data from a process that produced a product within manufacturing tolerances, golden run data from a recently qualified chamber, etc.) may be utilized as input 310 or target output 320.

In some embodiments, data set generator 372 generates a data set (e.g., training set, validating set, testing set) that includes one or more data inputs 310 (e.g., training input, validating input, testing input) and may include one or more target outputs 320 that correspond to the data inputs 310. The data set may also include mapping data that maps the data inputs 310 to the target outputs 320. Data inputs 310 may also be referred to as "features," "attributes," or "information." In some embodiments, data set generator 372 may provide the data set to the training engine 182, validating engine 184, or testing engine 186, where the data set is used to train, validate, or test one or more models 190 (e.g., one of the models that are included in model 190, ensemble model 190, etc.). In some embodiments, model 190 may include a physics-based digital twin model and a model used to analyze the output of the physics-based model. In some embodiments, data set generator 372 may supply input to the physics-based model as training input (e.g., manufacturing parameters), and may provide as target output data associated with the output of a second model (e.g., component contribution data from a machine learning model), and model 190 may be trained using these associated data sets. Some embodiments of generating a training set may further be described with respect to FIG. 5A.

In some embodiments, data set generator 372 generates data input 310 and does not generate target output 320, to supply a training dataset for an unsupervised machine learning model, such as a clustering model, an autoencoder, a dimension reduction model, etc. Operations of such models will be described further in connection with FIG. 7. In some embodiments, data set generator 372 generates the data input 310 and target output 320 (e.g., to train an unsupervised or semi-supervised model). In some embodiments, data inputs 310 may include one or more sets of data. As an example, system 300 may produce sets of sensor data that may include one or more of sensor data from one or more types of sensors, combination of sensor data from one or more types of sensors, patterns from sensor data from one or more types of sensors, manufacturing parameters from one or more manufacturing parameters, combinations of some manufacturing parameter data and some sensor data, summary data, etc.

In some embodiments, data set generator 372 may generate a first data input corresponding to a first set of historical sensor data 344A and/or historical manufacturing parameters 352A to train, validate, and/or test a first machine learning model and the data set generator 372 may generate a second data input corresponding to a second set of historical sensor data 344B and/or historical manufacturing parameters 352B to train, validate, and/or test a second machine learning model.

Data inputs 310 and target outputs 320 to train, validate, and/or test a machine learning model may include information for a particular manufacturing chamber (e.g., for particular substrate manufacturing equipment). For example, historical manufacturing parameters 352, historical sensor data 344, summary data, and performance data 322 may be associated with the same manufacturing chamber.

In some embodiments, the information used to train the machine learning model may be from specific types of manufacturing equipment (e.g., manufacturing equipment 124 of FIG. 1) of the manufacturing facility having specific characteristics and allow the trained model(s) to determine outcomes for a specific group of manufacturing equipment 124 based on input for current sensor data (e.g., current sensor data 146) associated with one or more components sharing characteristics of the specific group. In some embodiments, the information used to train the model may be for components from two or more manufacturing facilities and may allow the trained machine learning model to determine outcomes for components based on input from one manufacturing facility.

In some embodiments, subsequent to generating a data set and training, validating, or testing a machine learning model 190 using the data set, model 190 may be further trained, validated, or tested, or adjusted (e.g., adjusting weights or parameters associated with input data of model 190, such as parameters in a physics-based model or connection weights in a neural network).

Figure 4A:
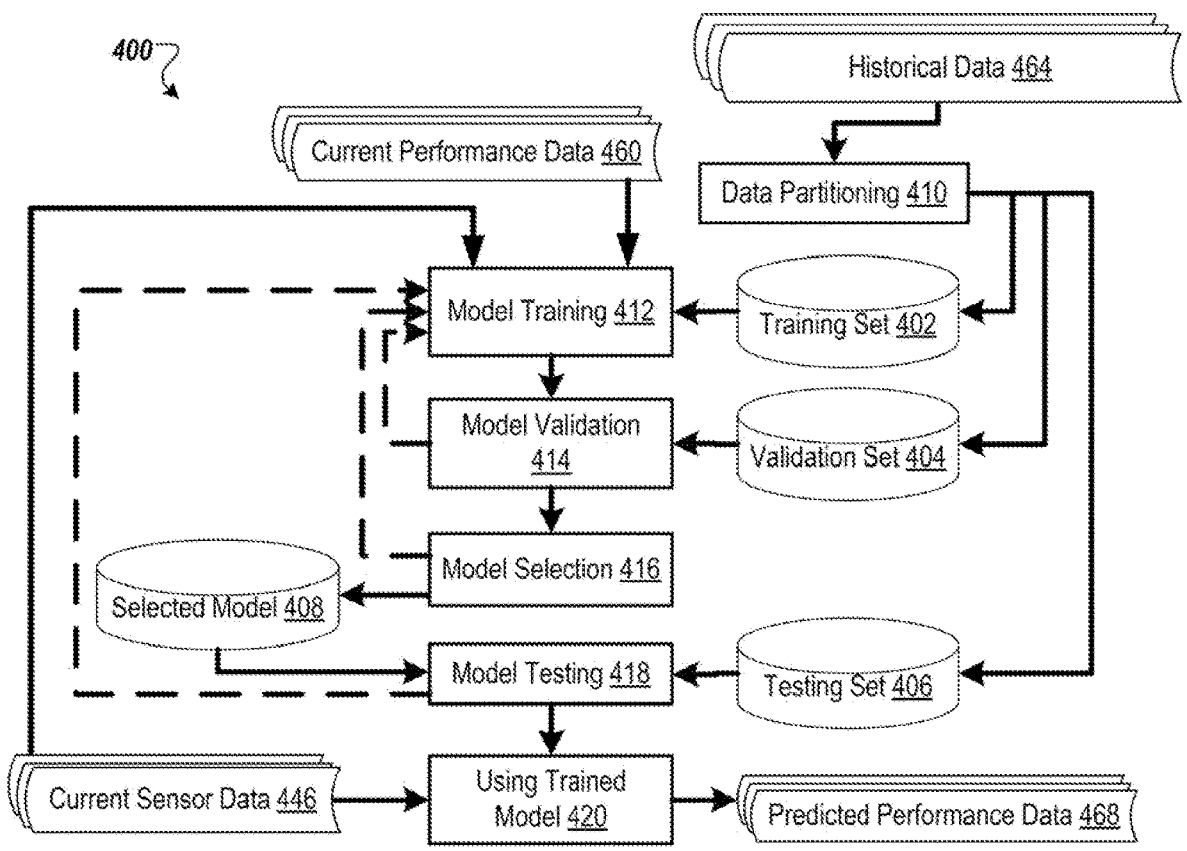
FIG. 4A is a block diagram illustrating a system for generating output data, according to some embodiments.

FIG. 4A is a block diagram illustrating system 400 for generating output data (e.g., predictive data 168 of FIG. 1), according to some embodiments. In some embodiments, system 400 may be used to in conjunction with a machine learning model (e.g., model 190 of FIG. 1) to determine the correlation between sensors and performance of a tool, chamber, or set of manufacturing equipment, which may inform performance of a corrective action (e.g., a corrective action may be performed in view of simulated sensor data). In some embodiments, a system analogous to system 400 may be using in conjunction with a physics-based model to determine a corrective action associated with manufacturing equipment.

At block 410, system 400 (e.g., components of predictive system 110 of FIG. 1) performs data partitioning (e.g., via data set generator 172 of server machine 170 of FIG. 1) of the historical data 464 (e.g., historical performance data, historical manufacturing parameters 152 and historical sensor data 144 for model 190 of FIG. 1) to generate the training set 402, validation set 404, and testing set 406. For example, the training set may be 60% of the historical data, the validation set may be 20% of the historical data, and the testing set may be 20% of the historical data.

The generation of training set 402, validation set 404, and testing set 406 can be tailored for a particular application. For example, the training set may be 60% of the historical data, the validation set may be 20% of the historical data, and the testing set may be 20% of the historical data. System 400 may generate a plurality of sets of features for each of the training set, the validation set, and the testing set. For example, if historical data 464 includes features derived from sensor data from 20 sensors (e.g., sensors 126 of FIG. 1) and 10 manufacturing parameters (e.g., manufacturing parameters that correspond to the sensor data from the 20 sensors), the sensor data may be divided into a first set of features including sensors 1-10 and a second set of features including sensors 11-20. The manufacturing parameters may also be divided into sets, for instance a first set of manufacturing parameters including parameters 1-5, and a second set of manufacturing parameters including parameters 6-10. Either target input, target output, both, or neither may be divided into sets. Multiple machine learning models, physics-based models, etc. may be trained on different sets of data.

At block 412, system 400 performs model training (e.g., via training engine 182 of FIG. 1) using the training set 402. Training of a machine learning model and/or of a physics-based model (e.g., a digital twin) may be achieved in a supervised learning manner, which involves feeding a training dataset including labeled inputs through the model, observing its outputs, defining an error (by measuring the difference between the outputs and the label values), and using techniques such as deep gradient descent and backpropagation to tune the weights of the model such that the error is minimized. In many applications, repeating this process across the many labeled inputs in the training dataset yields a model that can produce correct output when presented with inputs that are different than the ones present in the training dataset.

For each training data item in the training dataset, the training data item may be input into the model (e.g., into the machine learning model). The model may then process the input training data item (e.g., a process recipe from a historical run) to generate an output. The output may include, for example, predicted performance data of a processed product. The output may be compared to a label of the training data item (e.g., actual performance metrics that were measured).

Processing logic may then compare the generated output (e.g., predicted performance) to the label (e.g., actual performance measurements) that was included in the training data item. Processing logic determines an error (i.e., a classification error) based on the differences between the output and the label(s). Processing logic adjusts one or more weights and/or values of the model based on the error.

In the case of training a neural network, an error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons", where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

System 400 may train multiple models using multiple sets of features of the training set 402 (e.g., a first set of features of the training set 402, a second set of features of the training set 402, etc.). For example, system 400 may train a model to generate a first trained model using the first set of features in the training set (e.g., sensor data from sensors 1-10) and to generate a second trained model using the second set of features in the training set (e.g., sensor data from sensors 11-20). In some embodiments, the first trained model and the second trained model may be combined to generate a third trained model (e.g., which may be a better predictor than the first or the second trained model on its own). In some embodiments, sets of features used in comparing models may overlap (e.g., first set of features being sensor data from sensors 1-15 and second set of features being sensors 5-20).

In some embodiments, hundreds of models may be generated including models with various permutations of features and combinations of models. In some embodiments, hundreds or more models may be stacked together to generate one ensemble model with greater predictive power than the individual models alone.

At block 414, system 400 performs model validation (e.g., via validation engine 184 of FIG. 1) using the validation set 404. System 400 may validate each of the trained models using a corresponding set of features of the validation set 404. For example, system 400 may validate the first trained model using the first set of features in the validation set (e.g., sensor data from sensors 1-10) and the second trained model using the second set of features in the validation set (e.g., sensor data from sensors 11-20). In some embodiments, system 400 may validate hundreds of models (e.g., models with various permutations of features, combinations of models, etc.) generated at block 412. At block 414, system 400 may determine an accuracy of each of the one or more trained models (e.g., via model validation) and may determine whether one or more of the trained models has an accuracy that meets a threshold accuracy. Responsive to determining that none of the trained models has an accuracy that meets a threshold accuracy, flow returns to block 412 where system 400 performs model training using different sets of features of the training set. Responsive to determining that one or more of the trained models has an accuracy that meets a threshold accuracy, flow continues to block 416. System 400 may discard the trained models that have an accuracy that is below the threshold accuracy (e.g., based on the validation set).

At block 416, system 400 performs model selection (e.g., via selection engine 185 of FIG. 1) to determine which of the one or more trained models that meet the threshold accuracy has the highest accuracy (e.g., the selected model 408, based on the validating of block 414). Responsive to determining that two or more of the trained models that meet the threshold accuracy have the same accuracy, flow may return to block 412 where system 400 performs model training using further refined training sets corresponding to further refined sets of features for determining a trained model that has the highest accuracy.

At block 418, system 400 performs model testing (e.g., via testing engine 186 of FIG. 1) using testing set 406 to test selected model 408. System 400 may test, using the first set of features in the testing set (e.g., sensor data from sensors 1-10), the first trained model to determine the first trained model meets a threshold accuracy (e.g., based on the first set of features of the testing set 406). Responsive to accuracy of the selected model 408 not meeting the threshold accuracy (e.g., the selected model 408 is overly fit to the training set 402 and/or validation set 404 and is not applicable to other data sets such as testing set 406), flow continues to block 412 where system 400 performs model training (e.g., retraining) using different training sets corresponding to different sets of features (e.g., sensor data from different sensors). Responsive to determining that selected model 408 has an accuracy that meets a threshold accuracy based on testing set 406, flow continues to block 420. In at least block 412, the model may learn patterns in the historical data to make predictions and in block 418, system 400 may apply the model on the remaining data (e.g., testing set 406) to test the predictions.

At block 420, system 400 uses the trained model (e.g., selected model 408) to receive current sensor data 446 (e.g., current sensor data 146 of FIG. 1) and determines (e.g., extracts), from the output of the trained model, predicted performance data 468 (e.g., predictive data 168 of FIG. 1).

A corrective action associated with the manufacturing equipment 124 of FIG. 1 may be performed in view of predicted performance data 468. In some embodiments, current sensor data 446 may correspond to the same types of features in the historical manufacturing parameter data. In some embodiments, current sensor data 446 corresponds to a same type of features as a subset of the types of features in historical manufacturing parameter data that are used to train selected model 408.

In some embodiments, current data is received. Current data may include current performance data 460 (e.g., metrology data 160 of FIG. 1). Model 408 is re-trained based on the current data. In some embodiments, a new model is trained based on the current sensor data 446 and the current performance data 460.

In some embodiments, one or more of the acts 410-420 may occur in various orders and/or with other acts not presented and described herein. In some embodiments, one or more of acts 410-420 may not be performed. For example, in some embodiments, one or more of data partitioning of block 410, model validation of block 414, model selection of block 416, or model testing of block 418 may not be performed.

A system analogous to system 400 of FIG. 4A may be configured for training, validating, testing, and using a physics-based digital twin model. The physics-based model is configured to accept as input manufacturing parameters (e.g., set points provided to manufacturing equipment) and provide as output simulated sensor data (e.g., predicted sensor data). Other models in connection with this physics-based model may follow a similar data flow in training, validating, testing and using. In some embodiments, a model may receive simulated sensor data and measured sensor data, and be configured to output a list of components predicted to contribute to differences between the two data sets. The model may provide estimates of how much each component is contributing to the variations. For example, the model may provide an estimate of power delivery to a component. Sensor data describing power delivery may be provided to the physics-based model, or the output of the physics-based model and the sensor data may be provided to another model. Differences between the predicted and measured data may be indicative of aging, failing, drifting, etc., components. Partitioning, training, validating, selection, testing, and using blocks of system 400 may be executed similarly to train additional models, utilizing different data types of data. Retraining may also be performed, utilizing current simulated sensor data and current measured sensor data. In some embodiments, golden run data may also be supplied for partitioning, training, validation, selection, testing, and using of a machine learning or physics-based model.

Figure 4B:
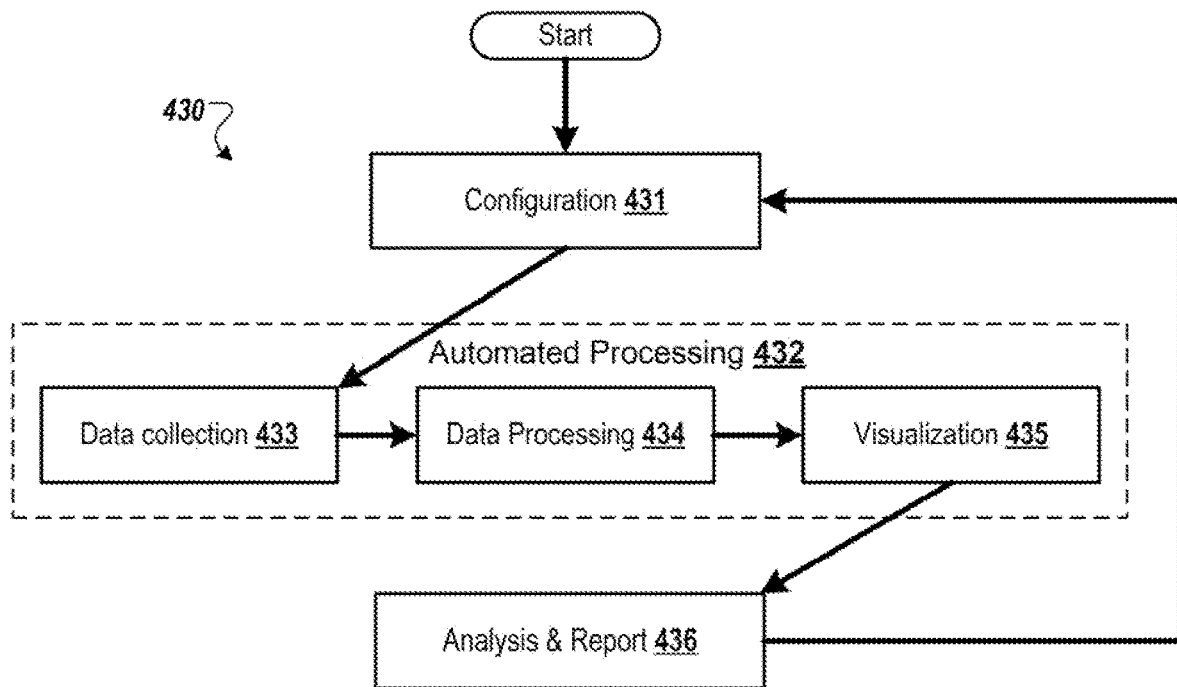
FIG. 4B is a flow diagram of a method for performing tool to tool matching analysis using trace sensor data, according to some embodiments.

FIG. 4B is a flow diagram of method 430 for performing TTTM analysis using trace sensor data, according to some embodiments. In some embodiments, operations of method 430 may be performed after the various machine learning models, statistical models, digital twin models, etc., to be used as part of the TTTM analysis module are trained.

At block 431, configuration operations are performed. In some embodiments, configuration operations are performed by a user. In some embodiments, a user may interact with a graphical user interface to configure the TTTM system. In some embodiments, another method such as text entry, command line control, etc., may be utilized to configure the TTTM system. In some embodiments, configuration settings (e.g., a document or file containing data indicative of configuration settings) may be referenced by a processing device performing TTTM analysis repeatedly throughout the analysis.

Configuration settings may include labelling information and conventions, including date(s), recipe labels, product labels, equipment and/or sensor labels, etc. Configuration settings may include indications to utilize data collected by one or more tools, one or more sensors, in connection with one or more processing runs or products, etc. Configuration settings may include instructions to a processing device to perform (or not perform) types of analysis. Configuration settings may indicate what metrics to utilize, which types of summary data to generate, what models (e.g., machine learning models) are to be used in analysis, what features of the TTTM software module are to be utilized in analysis (e.g., whether inlier drift detection or time trace analysis is to be performed), etc. Configuration settings may include indications of conditional thresholds for performing further analysis, e.g., control limits to classify a data point as an outlier, a threshold number of outliers to trigger drill-down analysis, etc. Configuration settings may include indications of metric value aggregation and/or index aggregation to be performed by the TTTM module. In some embodiments, a user may be able to store one or more "favorite" configuration settings, for use in future TTTM analyses. In some embodiments, configuration settings may include options for visualization, including types of plots to generate (e.g., boxplot, histogram, scatter plot, etc.), number of plots to generate, a threshold metric or index value to trigger generation of a plot, design elements of generated plots, whether a best fit or trend line is to be calculated and/or displayed on a plot, etc.

Once configuration settings have been determined (or a default setting, favorites setting, or the like has been selected), automated processing procedures 432 are performed. In some embodiments, the TTTM module (guided by configuration settings) performs many operations independently to generate an analysis of sensor data. The operations of automated processing procedures 432 are discussed in more detail in connection with FIGS. 5B-I, with a brief summary of these operations included here.

At block 433, data collection operations are performed by a processing device. According to configuration settings, data is retrieved by a processing device for analysis. Data retrieved may include trace sensor data, preprocessed sensor data, manufacturing data (e.g., hardware or processing parameters, recipe information, etc.), summary data, etc.

At block 434, data processing operations are performed by a processing device. In some embodiments, data processing is performed in accordance with configuration settings. Data processing may include generation of metric values, indices, aggregated metrics and indices, trace analysis, drift analysis, etc. Data processing may include providing data (e.g., data collected at block 433) to one or more models to generate output. Data processing models may include machine learning models, digital twin models, statistical models, etc. Data processing operations are discussed in more detail in connection with FIG. 5D.

At block 435, processing logic performs visualization operations. Visualization operations may be performed subject to configuration settings. In some embodiments, generation of visualizations may be triggered by conditions met during data processing, e.g., a metric value exceeding a threshold, a certain portion of data points being classed as outliers, etc. In some embodiments, visualizations may be generated at multiple stages of analysis, e.g., TTTM index values may be plotted, and one or more aggregations of TTTM index values may also be plotted. Visualization may be performed using any convenient plotting scheme, e.g., boxplots, histograms, scatter plots, pie charts, etc. Visualizations are discussed in more detail in connection with FIGS. 6A-G.

At block 436, processing logic performs analysis and reporting operations. In some embodiments, operations of block 436 are provided to a user. In some embodiments, operations of block 436 may be triggered automatically (e.g., case evaluation procedures to evaluate the performance of the TTTM module may occur periodically). In some embodiments, operations of block 436 may be triggered by a user. In some embodiments, results of operations of block 436 may inform configuration settings for a future analysis (as indicated in FIG. 4B by the arrow returning to block 431).

Figure 4C:
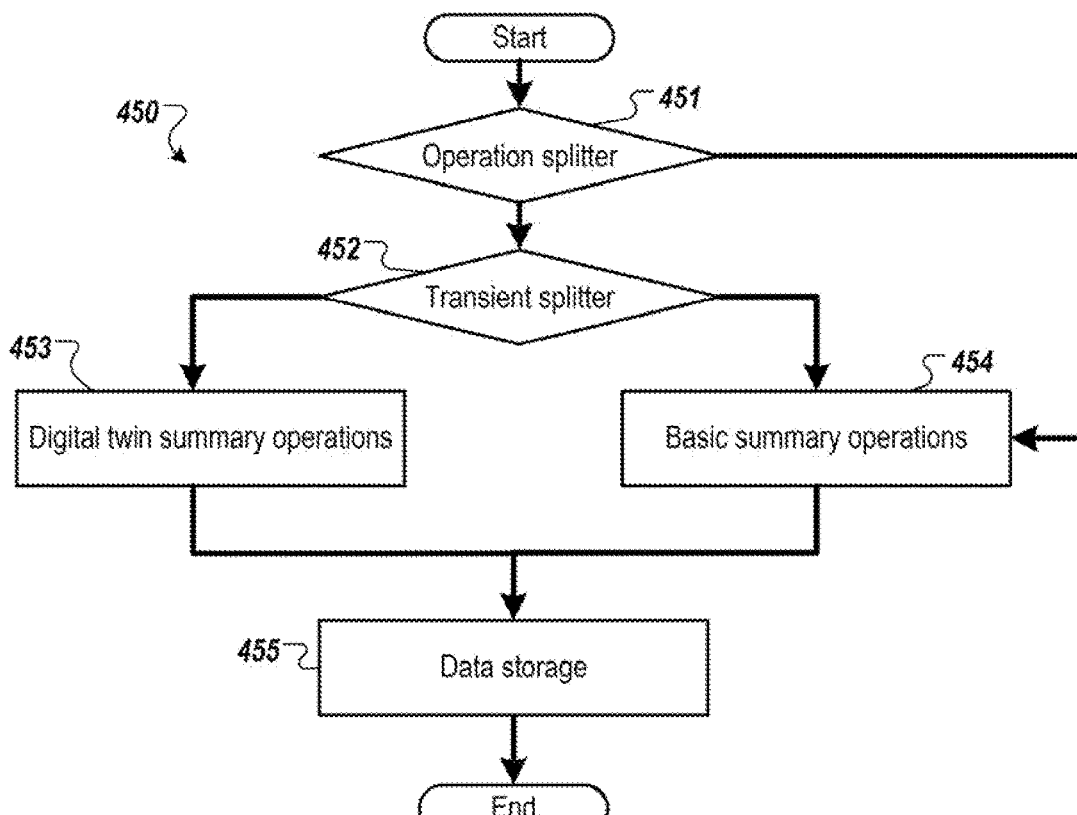
FIG. 4C is a flow diagram of a method for generating summary data, according to some embodiments.

FIG. 4C is a flow diagram depicting method 450 for generating summary data, according to some embodiments. Generation of summary data may begin with collection of trace data. As an example, method 450 acts upon a full trace from a single run and a single sensor. In other embodiments, data from multiple sensors, multiple runs, etc., may be used to generate summary data. In some embodiments, trace data may be stored separated into process operations, and operation-separated data may be utilized to generate summary data. In some embodiments, preprocessing may be performed on the data, e.g., smoothing, interpolation, normalization, etc. Preprocessing may be performed at various stages of analysis.

At block 451, full trace data from a single run is split by processing logic into processing operations. In some embodiments, full trace data and data split into separate processing operations (e.g., steps of a processing recipe) may be provided to processing logic to perform basic summary operations. Data may be split into processing operations based on time stamps of data points, behavior of the trace data, behavior of a reference trace data, etc. Data split into processing operations may be provided to a processing device to be further split into transient and steady-state portions. In some embodiments, various operations may be performed in a different order than that depicted in FIG. 4C, and be within the scope of this disclosure.

Figure 6A:
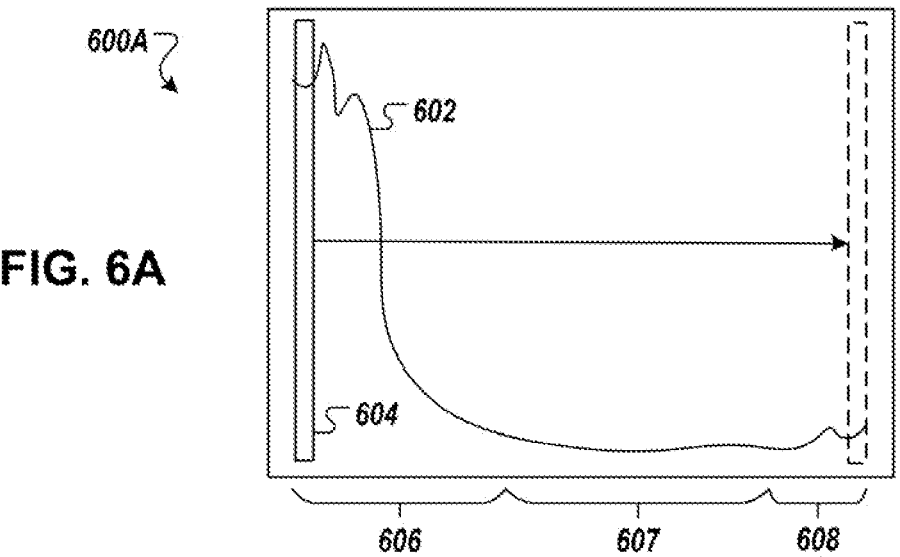
FIG. 6A depicts a visualization of operations for splitting a trace into transient and steady-state portions, according to some embodiments.

At block 452, trace data split into processing operations is further split into transient and steady state portions. A visualization of transient portion splitting is depicted in FIG. 6A. In some embodiments, process parameters such as temperature or voltage may have an operational set-point. It may take an amount of time to reach such a set-point, where property values change rapidly. Periods of rapid change of property values may be separated as transient portions of the trace data, and periods where property values are more steady may be separated as steady-state portions of the trace data. In some embodiments, a processing recipe may call for a property (e.g., temperature) to change in a controlled fashion for a period of time (e.g., ramp-up). Such periods, that are neither steady-state nor transient, may also be separated and analyzed. In some embodiments, ramp data may be analyzed as steady-state data. In some embodiments, ramp data may be analyzed as transient data. In some embodiments, ramp data may be analyzed in a different way than either steady-state or transient data. In some embodiments, ramp data may be analyzed utilizing features from transient data analysis and/or steady state analysis.

Transient and steady-state portions of trace data may be separated by a processing device. In some embodiments, separation of transient and steady-state portions may be performed in accordance with configuration settings. Identification of a transient portion of trace data may include determining the slope of the trace data, one or more statistical measures of the data (e.g., standard deviation, range, etc.), be based on prior knowledge (e.g., a time to steady-state estimation derived from golden run data), etc. In some embodiments, a sliding window is utilized to separate transient and steady-state portions of trace data. A window smaller (e.g., containing fewer data points) than the trace data associated with the operation may be analyzed. In some embodiments, the points within the window may be determined to be a part of a steady-state portion or part of a transient portion. In some embodiments, if the standard deviation of the points within the window is greater than a threshold, the points in the window may be determined to be part of a transient portion. The window may then be moved to include a different subset of data points of the processing operation trace data. The size of the window, the metric used to determine if a portion of the trace data is transient (e.g., slope, standard deviation, quartile values, range, etc.), the threshold at which a determination of transience is made, etc., may all be performed subject to configuration settings. In some embodiments, interfaces between portions designated as steady-state and those designated as transient may be subject to further processing, e.g., changing window size, changing determining metric, changing threshold metric value, etc. Data split into transient and steady-state (and ramp, or another type) portions are provided to processing logic to generate summary data. In some embodiments, steady-state portions and transient portions are provided to processing logic to perform basic data summary operations (block 454). In some embodiments, transient portions are provided to processing logic to perform digital twin summary operations (block 453).

At block 453, processing logic performs digital twin summary operations. In some embodiments, digital twin summary operations are performed in connection with transient portions of trace data. In some embodiments, a digital twin model of a physical asset is generated. The physical asset may include one or more components of a manufacturing system. Performance of the physical asset may be modeled by the digital twin, and the modeled behavior compared to behavior recorded by one or more sensors associated with the manufacturing system. A visualization of digital twin data for use in generating summary data may be found at FIG. 6B.

A variety of features of the transient portion may be compared to the digital twin output to generate summary data. In some systems, a property value may exceed (e.g., overshoot) a set point before settling to the set point value. The properties of the overshoot region of the trace data (e.g., value of the overshoot, length of time of the overshoot, time the maximum or minimum value of the overshoot was reached, etc.) may be used to generate summary data. In some embodiments, a property value may exhibit a rise time to reach a set point. Rise time properties of sensor data may be compared to digital twin data to generate summary data, e.g., the time required for the property value to reach 50% of the indicated value, 90% of the indicated value, etc. In some embodiments, it may take some time for a property value to settle to a set point (e.g., after an overshoot). The settle time may be utilized to generate summary data (e.g., time until value remains within 5% of a set point, 2% of a set point, etc.). In some embodiments, the final property value reached may differ from the set point. Summary data may be generated based on the difference. In some embodiments, properties of a closed-loop control system may be modeled by a digital twin model. Properties such as gain, phase, and bandwidth of the closed-loop control system may also be monitored and used to generate summary data. In some embodiments, a property value may oscillate (e.g., as it approaches a set point, the value may go above and below the set point a few times before settling). The detection of such an oscillation, and properties of the oscillation such as frequency, amplitude, etc., may be included in summary data. In some embodiments, the maximum, minimum, slope, mean, or other metrics may be included in summary data associated with a transient portion.

At block 454, basic summary operations are performed by processing logic. In some embodiments, several portions are provided to basic summary operation logic (e.g., both transient and steady-state data may be provided to basic summary operation logic). In some embodiments, basic summary data may include meta data, e.g., data associated with a processing run. Meta data may include the processing run start time, run ID, tool ID, tool name, lot name, lot ID, processing recipe name, product ID, product information (e.g., product design), product number, product count (e.g., number of products since the last maintenance event), etc.

In some embodiments, basic summary data may include context data, e.g., data associated with a sensor, processing operation, or the like. Context data may include a channel or sensor name or ID, a process operation number (e.g., step number), a time stamp of the process operation, an operation name or ID, operation type (e.g., etch operation, deposition operation, etc.), manufacturing subsystem name or ID, etc.

In some embodiments, basic summary data may include statistical information associated with the trace data. Statistical information may include the data mean, median, minimum, maximum, range, quartile and other percentile information, standard deviation, skew, kurtosis, a flag indicating if the data is within a control range, etc. Basic summary data may be generated in accordance with configuration settings. At block 455, summary data is stored for future use, e.g., by the TTTM module. Summary data may be stored in a data store, for example, data store 140 of FIG. 1.

FIGS. 5A-I are flow diagrams of methods 500A-I associated with generating data to cause a corrective action, according to certain embodiments. Methods 500A-I may be performed by processing logic that may include hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiment, methods 500A-I may be performed, in part, by predictive system 110. Method 500A may be performed, in part, by predictive system 110 (e.g., server machine 170 and data set generator 172 of FIG. 1, data set generator 372 of FIG. 3). Predictive system 110 may use method 500A to generate a data set to at least one of train, validate, or test a machine learning model, in accordance with embodiments of the disclosure. Methods 500B through 500I may be performed by predictive server 112 (e.g., predictive component 114). In some embodiments, a non-transitory storage medium stores instructions that when executed by a processing device (e.g., of predictive system 110, of server machine 180, of predictive server 112, etc.) cause the processing device to perform one or more of methods 500A-I.

For simplicity of explanation, methods 500A-I are depicted and described as a series of operations. However, operations in accordance with this disclosure can occur in various orders and/or concurrently and with other operations not presented and described herein. Furthermore, not all illustrated operations may be performed to implement methods 500A-I in accordance with the disclosed subject matter. In addition, those skilled in the art will understand and appreciate that methods 500A-I could alternatively be represented as a series of interrelated states via a state diagram or events.

Figure 5A:
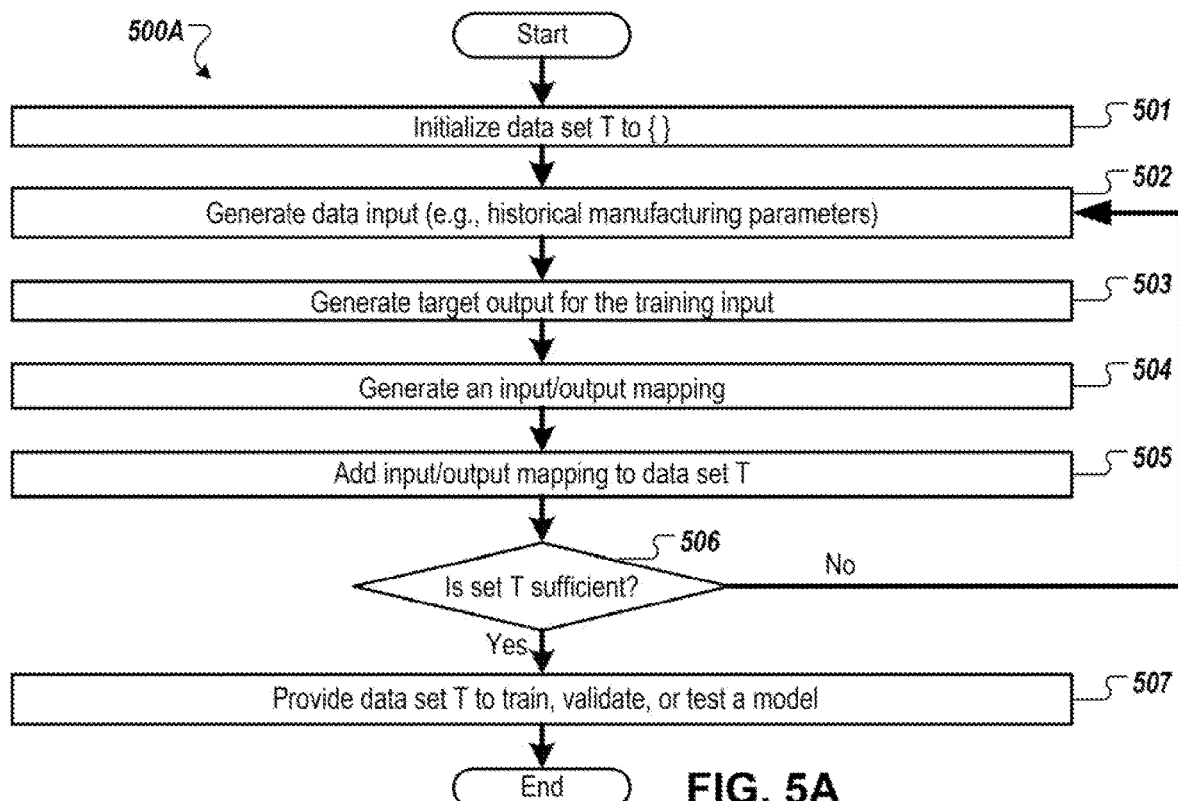
FIG. 5A is a flow diagram of a method for generating a data set for a model for generating predictive data, according to some embodiments.

FIG. 5A is a flow diagram of a method 500A for generating a data set for a model for generating predictive data (e.g., predictive data 168 of FIG. 1), according to certain embodiments.

Referring to FIG. 5A, in some embodiments, at block 501 the processing logic implementing method 500A initializes a training set T to an empty set.

At block 502, processing logic generates first data input (e.g., first training input, first validating input) that may include one or more of sensor data (e.g., historical sensor data 144 of FIG. 1; historical sensor data 344 of FIG. 3), manufacturing parameters (e.g., historical manufacturing parameters 152 of FIG. 1), etc. In some embodiments, the first data input may include a first set of features for types of data and a second data input may include a second set of features for types of data (e.g., as described with respect to FIG. 4A).

In some embodiments, at block 503, processing logic generates a first target output for one or more of the data inputs (e.g., first data input). In some embodiments, the first target output is performance data (e.g., metrology data of processed products, faulty components, etc.). In some embodiments, input data may be in the form of sensor data and target output may be a list of components likely to be faulty, as in the case of a machine learning model configured to perform in connection with a physics-based digital twin model. In some embodiments, no target output is generated (e.g., an unsupervised machine learning model capable of grouping or finding correlations in input data, rather than requiring target output to be provided).

At block 504, processing logic optionally generates mapping data that is indicative of an input/output mapping. The input/output mapping (or mapping data) may refer to the data input (e.g., one or more of the data inputs described herein), the target output for the data input, and an association between the data input(s) and the target output. In some embodiments, such as in association with machine learning models where no target output is provided, block 504 may not be executed.

At block 505, processing logic adds the mapping data generated at block 504 to data set T, in some embodiments.

At block 506, processing logic branches based on whether data set T is sufficient for at least one of training, validating, and/or testing model 190. If so, execution proceeds to block 507, otherwise, execution continues back at block 502. It should be noted that in some embodiments, the sufficiency of data set T may be determined based simply on the number of inputs, mapped in some embodiments to outputs, in the data set, while in some other embodiments, the sufficiency of data set T may be determined based on one or more other criteria (e.g., a measure of diversity of the data examples, accuracy, etc.) in addition to, or instead of, the number of inputs.

At block 507, processing logic provides data set T (e.g., to server machine 180) to train, validate, and/or test machine learning model 190. In some embodiments, data set T is a training set and is provided to training engine 182 of server machine 180 to perform the training. In some embodiments, data set T is a validation set and is provided to validation engine 184 of server machine 180 to perform the validating. In some embodiments, data set T is a testing set and is provided to testing engine 186 of server machine 180 to perform the testing. In the case of a neural network, for example, input values of a given input/output mapping (e.g., numerical values associated with data inputs 310) are input to the neural network, and output values (e.g., numerical values associated with target outputs 320) of the input/output mapping are stored in the output nodes of the neural network. The connection weights in the neural network are then adjusted in accordance with a learning algorithm (e.g., back propagation, etc.), and the procedure is repeated for the other input/output mappings in data set T. After block 507, a model (e.g., model 190) can be at least one of trained using training engine 182 of server machine 180, validated using validating engine 184 of server machine 180, or tested using testing engine 186 of server machine 180. The trained model may be implemented by predictive component 114 (of predictive server 112) to generate predictive data 168 for performing signal processing or for performing corrective action associated with manufacturing equipment 124.

Figure 5B:
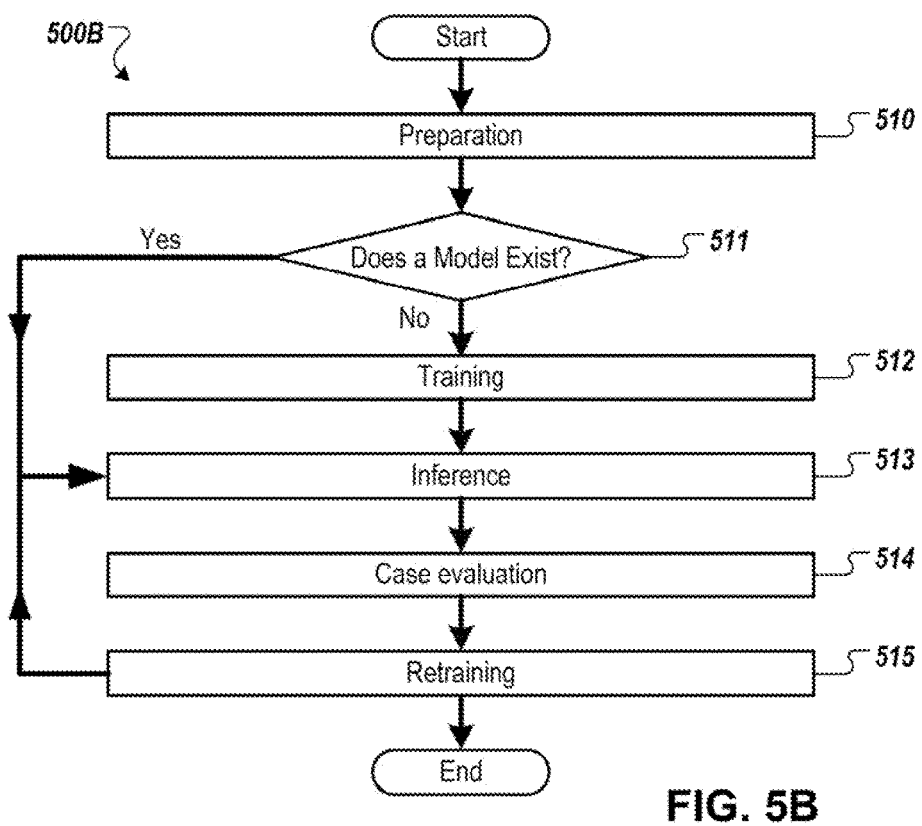
FIG. 5B is a flow diagram of a method for utilizing one or more models to perform a corrective action, according to some embodiments.

FIG. 5B is a flow diagram of method 500B for utilizing one or more models to determine a corrective action to be performed, according to some embodiments. Operations of FIG. 5B may be included in the automated processing operations described in connection with FIG. 4B.

Referring to FIG. 5B, at block 510, processing logic performs preparation operations associated with generating tool to tool matching (TTTM) information indicative of a corrective action. Preparation operations may be triggered by manual input (e.g., upon recognition of suboptimal performance, in response to suboptimal metrology data of one or more finished products, etc.), at a scheduled timing interval, or the like. TTTM analysis preparation may include data collection logic. Data (e.g., sensor trace data) may be retrieved from a data store. Data collection may be performed according to configuration settings. Data collected may include the date the process was performed, tool ID of the manufacturing equipment, recipe name, data indicative of key operations, sensors, or parameters, etc. Configuration settings may include which of these types of data to collect, and indications of procedures for preprocessing (e.g., data cleaning, resampling, averaging, smoothing, etc.). Processing logic may perform data preprocessing as part of preparation operations.

Preparation operations may further include processing logic generating summary data, e.g., associated with a manufacturing process. Data summarization operations are discussed in detail in connection with FIG. 4C. Data summarization may be performed according to configuration settings. In some embodiments, summarization data is generated from trace sensor data. Trace sensor data may be separated into parts, and summarization data extracted separately from each part. For example, trace sensor data may be separated into one or more transient and one or more steady state parts. In some embodiments, a sliding window is used to provide statistics of data values of a portion of the trace. If a particular statistical marker (e.g., standard deviation, variance, etc.) of the points within the window is larger (or smaller) than a threshold, the points in that window may be determined to be included in a steady state portion of the trace data, a transient portion of the trace data, etc. Other metrics (e.g., slope of the data, time thresholds, etc.) may be used to designate steady state and transient portions of the trace data. In some embodiments, steady state data and transient data are treated differently by the summarization logic. Configuration settings may include adjustments to how steady state and transient portions are identified, such as window size, value or identity of a metric determining which portion a window belongs to, etc. In some embodiments, different data is included in summary data for different portions of the trace data. In some embodiments, a physics-based (e.g., digital twin) model of a component is used to generate predictions of behavior. In some embodiments, differences between digital twin predictions and measured sensor data are utilized to generate summary data. For example, a digital twin model may predict that voltage supplied to a component (e.g., an electrostatic chuck) may have a particular rise time (e.g., time to reach 90% of a target value), a characteristic overshoot (e.g., percent over target value of the peak voltage), and a settle time (e.g., oscillation time before reaching a steady value). Summarization logic may include recording differences between measured transient portions of sensor data and predictions of such metrics by a digital twin model.

Summary data may include metadata, context data, statistics, and digital twin-assisted summary data. Metadata may include data describing a manufacturing process (e.g., the conditions under which a semiconductor wafer was processed). Metadata may include a run start time, a recipe ID, a tool ID associated with the manufacturing equipment, a tool name, a lot name and/or ID, a product ID, product information, a product number, a count of products produced by the tool, etc. Context data may include data describing trace data, such as sensor ID, recipe operation number, time stamp data, subsystem, operation type, etc. Statistical data may include average value, minimum and maximum values, percentile (e.g., quartile) values, variance, skew, kurtosis, range, inter quartile range, lower and upper control limits (e.g., calculated from other statistics, such as three standard deviations from the average or some multiple of the inter-quartile range outside a percentile value, etc.), or the like. Digital twin-assisted summary data may include overshoot (e.g., percent difference between a target value of a property and the peak value of the property), rise time (e.g., time for a property to adjust to 90% of the target value), settle time (e.g., time for the measured value to come within some threshold of the target value), steady state error (e.g., percent difference between the measured final value and target value), closed-loop control system parameters such as gain margin (e.g., the difference in gain between no gain and the system gain at the frequency where the phase offset between input and output is) 180°, phase margin (e.g., the difference in phase offset between the system phase and 180° at the frequency where there is no gain), and bandwidth; oscillation detection, oscillation frequency, oscillation amplitude, etc.

At block 511, processing logic checks for one or more existing models compatible with the data to be analyzed. An existing model may be a model trained using historical data. An existing model's compatibility may be determined based on being trained on the same set of manufacturing equipment, the same type of manufacturing equipment, for the same or a similar process, etc. If an existing compatible model does not exist, flow continues to block 512. If an existing compatible model does exist, flow continues to block 513.

At block 512, processing logic performs training operations associated with performing TTTM analysis. Training operations are discussed in more detail in connection with FIG. 5C. Training operations may include retrieving data associated with one or more manufacturing processes, such as from data store 140 of FIG. 1. Training operations may include retrieving and/or generating golden run sensor data, retrieving summary data, retrieving trace data, etc. Training operations may be performed subject to configuration settings.

At block 513, processing logic performs inference operations associated with TTTM analysis. Inference operations will be discussed in more detail in connection with FIG. 5D. Inference may include analysis using one or more models. Models may include physics-based models, digital twin models, machine learning models, etc. Inference may be performed in accordance with configuration settings. Inference operations may be performed responsive to prior inference operations, e.g., further drill down analysis may be performed responsive to the output of prior operations satisfying one or more criteria. The results of inference may include indications of corrective actions, systems or components for further follow up, scheduled maintenance, etc. Inference operations may include visualization of results.

At block 514, processing logic performs case evaluation operations associated with TTTM analysis. Case evaluation procedures may be used to generate information indicative of the performance of the TTTM analysis procedures. The performance of the various models and algorithms may be evaluated. Case evaluation operations may include comparing predicted performance metrics with measured performance metrics. In some embodiments, case evaluation may be triggered by a user. In some embodiments, case evaluation may be triggered by results, e.g., results of a TTTM analysis outside a threshold range, results of metrology being outside a threshold range of similarity to TTTM analysis prediction, etc. In some embodiments, case evaluation may be performed according to a case evaluation schedule (e.g., every nth process, at a selected frequency, etc.). Data associated with a manufacturing process (e.g., sensor data, summary data, etc.) may be provided to processing logic with the output of the TTTM analysis (e.g., predicted faulty component or components, predicted drifting or aging subsystems, predicted metrology data of finished products, visualization of component or subsystem health, etc.). Measured performance data associated with the TTTM analysis output (e.g., results of maintenance to predicted faulty components, measured metrology of products, etc.) may also be provided to processing logic performing case evaluation.

Case evaluation operations may include and/or be directed at determining if the TTTM module (e.g., the one or more models included in TTTM analysis) is to be retrained. Processing logic may evaluate whether to perform retraining based on one or more of a number of metrics. In some embodiments, retraining may be performed based on a certain portion of the predictions not meeting accuracy thresholds, e.g., a fraction of predictions over a period of time. In some embodiments, retraining may be performed based on a number of products in a row not meeting accuracy thresholds. In some embodiments, retraining may be performed based on a known change to processing conditions, such as a recipe update, incoming material update, chamber maintenance performed, etc. Processing logic may perform an evaluation using data from cases with sufficiently accurate TTTM predictions and cases with unsatisfactory TTTM predictions. Processing logic may perform an evaluation using both positive cases (cases wherein TTTM analysis predicted a fault, aging, drift, etc., e.g., true positives and false positives) and negative cases (cases wherein TTTM analysis did not predict a fault, e.g., true negatives and false negatives).

Processing logic may further evaluate false cases (e.g., false positives, false negatives). False cases may be evaluated for root causes, e.g., potential modifications to the TTTM model to reduce false cases. In some embodiments, the effect of adjusting weights of operations, sensors, etc., may be evaluated. In some embodiments, the effect of adjusting control limits may be evaluated. In some embodiments, the effect of removing sensors, operations, etc., from future TTTM modeling may be evaluated. Processing logic may store results of case evaluation. Processing logic may generate a recommendation, e.g., to update or retrain all or part of the TTTM analysis module.

At block 515, processing logic performs retraining of the TTTM module.

Retraining may be performed subject to a recommendation generated during case evaluation of block 514. For example, processing logic may, during case evaluation operations, generate a recommendation to retrain sensor weights. During retraining operations, processing logic may carry out the recommendation by providing additional data to train one or more models utilized for TTTM analysis. In some embodiments, retraining may include model validation and/or testing. In some embodiments, retraining operations may include training a new model using different sensor data (e.g., a different set of sensors, as described in connection with FIG. 4A). In some embodiments (e.g., upon recommendation generated during case evaluation operations), retraining operations may not be performed. After retraining, flow may return to the inference stage (block 513) for TTTM analysis of additional products, processes, manufacturing equipment, etc.

Figure 5C:
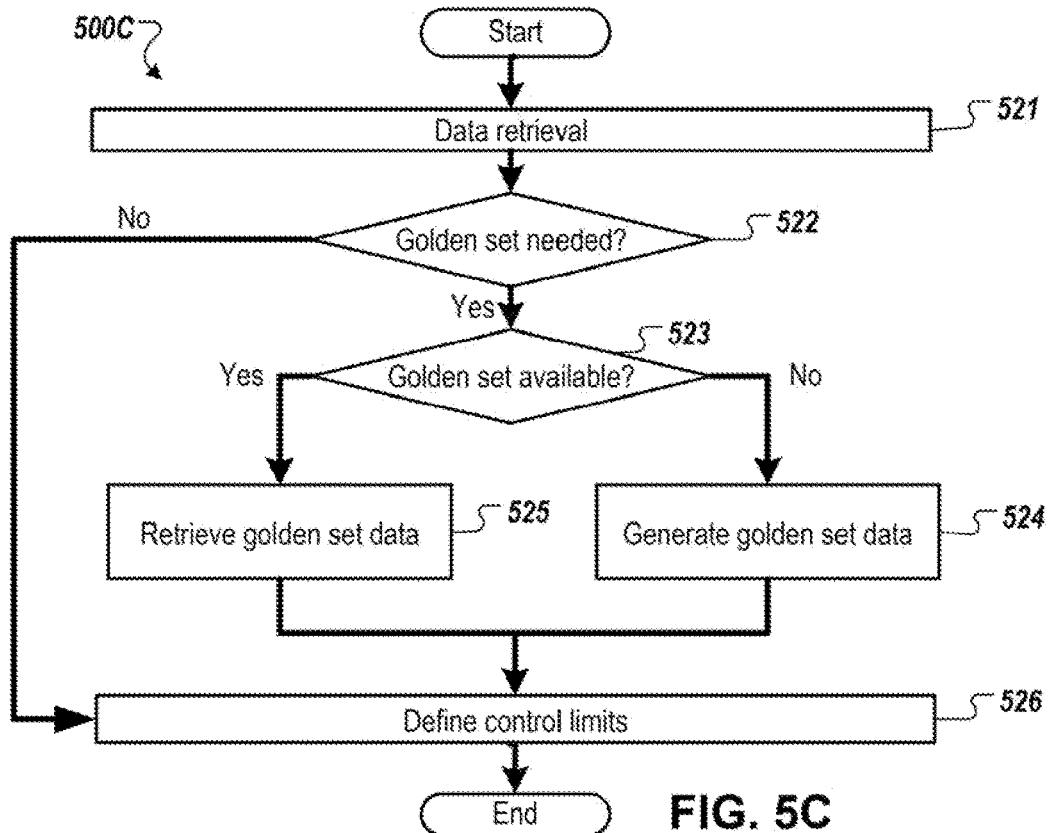
FIG. 5C is a flow diagram depicting a method of performing training operations of a tool to tool matching analysis, according to some embodiments.

FIG. 5C is a flow diagram depicting method 500C of performing training operations of a TTTM analysis method, according to some embodiments. These operations may be directed at preparing TTTM analysis for inference, and distinct from training a particular machine learning model, physics-based model, etc. At block 521, data for use in the TTTM analysis is retrieved. Retrieved data may include trace data, preprocessed trace data, summarized data, etc. Retrieved data may include data identified, generated, stored, etc., in preparation operations of TTTM analysis. Data may be retrieved subject to configuration settings, such as settings indicating which analysis techniques, which trained models, etc., are to be used in the TTTM analysis.

At block 522, processing logic determines if one or more golden data sets are to be used in the TTTM analysis. Golden data may include trace data, cleaned or preprocessed trace data, summary data, etc. associated with successfully manufactured product, associated with properly functioning equipment, and so on. Usage of one or more golden data sets may be based on configuration settings, based on which model or models are to be used as part of the TTTM analysis, etc. If no golden data set is to be used, flow continues to block 526. If one or more golden data sets are to be used, flow continues to block 523. At block 523, processing logic determines if one or more golden data sets are available (e.g., data designated as golden data is stored in data store 140). If golden data is available (e.g., golden data for every sensor, process, system, etc., for which golden data is to be used), flow continues to block 525 and the one or more golden data sets are retrieved. If golden data sets are not available (e.g., if one or more golden data sets to be used in TTTM analysis are not available), flow continues to block 524.

At block 524, processing logic generates one or more golden data sets. Data may be selected (e.g., from data store 140) by processing logic to act as one or more golden data sets. Data may be selected as golden data based on one or more indications that the data corresponds to acceptable processing parameters (e.g., processing parameters that facilitate production of a product within manufacturing tolerances). In some embodiments, a recently qualified (e.g., recently maintained, recently installed, etc.) tool, chamber, and/or set of manufacturing equipment may be designated as a golden tool. Data from processes performed by the golden tool may be designated golden data. In some embodiments, data indicating production of an acceptable product may be associated with sensor data (e.g., metrology data, classification or quality data, etc.). Sensor data (including preprocessed sensor data, summarized sensor data, etc.) associated with production of an acceptable product may be designated golden run data. In some embodiments, one or more sensors may have associated golden run data. In some embodiments, one or more processing operations may have associated golden run data.

At block 526, processing logic defines control limits. Control limits may be set according to configuration settings. In some embodiments, control limits may be established by user input (e.g., acceptable processing ranges may be selected by a user). In some embodiments, control limits may be calculated by processing logic (e.g., three standard deviations from the mean). In some embodiments, a hybrid system may be used (e.g., three standard deviations from the mean, but not more than a user-defined limit).

Figure 5D:
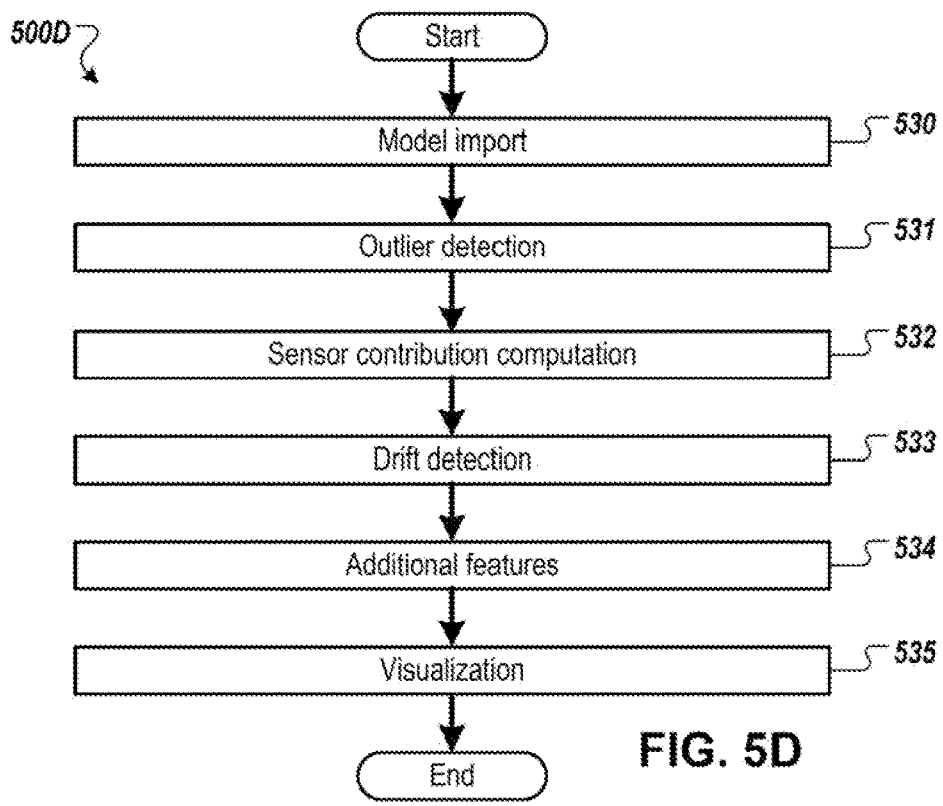
FIG. 5D is a flow diagram depicting a method of performing inference operations of a tool to tool matching analysis, according to some embodiments.

FIG. 5D is a flow diagram depicting method 500D of performing inference operations of a TTTM analysis method, according to some embodiments. At block 530, one or more models to be used in the TTTM analysis are imported. These may include trained machine learning models, physics-based models, digital twin models, statistical models, etc. Models may be imported in accordance with configuration settings.

At block 531, processing logic performs outlier detection operations. Summary data may be compared with control limits to determine if a data point (e.g., summary data associated with a set of trace data) is an outlier. Each sensor at each processing operation (e.g., recipe step) may be considered individually. A data point may be considered an outlier if any one summary data is outside control limits, if a number of summary data are outside control limits, if some total weight (e.g., summaries with more predictive power are given more weight) of summary data are outside control limits, etc. In some embodiments, individual outlier signals may be aggregated to generate an index (e.g., a TTTM index), indicative of performance and/or quality of a chamber, tool, process, facility, product, set of manufacturing equipment, etc.

In some embodiments, generation of a TTTM index may be dependent on sensor and process operation weight, and control limits. Some sensor-operation combinations may be found to have higher predictive power than others. For example, for processing operations of semiconductor substrates utilizing plasma, sensors indicative of parameters of the plasma may have high predictive power of chamber performance. For processing operations where plasma processing is not used, the same sensors may not provide information easily correlated with tool performance. A weighting factor may indicate the significance of contribution of the associated data to performance.

In some embodiments, data points classified as high outliers (e.g., above an upper control limit), low outliers (e.g., below a lower control limit), and inliers (e.g., between upper and lower control limits) may be treated differently. In some embodiments, one or more weighting factors may be applied to sensor data, summary data, etc. Weighting factors (e.g., weights) may indicate the impact of property values measured in a processing chamber on performance. In some embodiments, weights may apply to sensors (e.g., sensors closer to a substrate may produce data more closely correlated with performance). In some embodiments, weights may apply to processing operations (e.g., sensor data during etching operations may be more closely correlated with performance of an etching recipe than operations where etching does not occur, such as warm-up or cool-down operations). In some embodiments, weights may apply to a processing run (e.g., a processing run with a known problem may be given lower weight). In some embodiments, a weighting factor may apply to a type of data (e.g., a type of sensor such as temperature sensors, a type of summary data such as average may be given more weight than standard deviation, summary data from a transient portion may be given different weight than from a steady state portion of trace data, etc.). In some embodiments, a weighting factor may apply to a combination of conditions, such as a particular sensor during a particular operation (e.g., a sensor measuring voltage applied to generate a plasma may be generate results highly correlated with performance of a processing operation involving plasma, but may not be correlated well with performance in plasma-free operations).

In some embodiments, weights may be used to generate a TTTM index. In some embodiments, weights may be chosen such that the sum of weights from all sensors for each processing operation (e.g., processing step) may be normalized (e.g., equal to one). Outlier sensors for an operation may contribute zero to a TTTM index value, while inliers contribute their weight. If all sensors are inliers, the TTTM index may then be one (or may be scaled to a different value). TTTM index values lower than one (or the scaled value) may indicate that further analysis is recommended into that manufacturing process, operation, tool, facility, or the like.

In some embodiments, weights may be assigned (or assignment of weights may be assisted) by a weight finder model. In some embodiments, the weight finder model may include a machine learning model. A machine learning model may be trained using data associated with sensors (e.g., summary data) as training input and performance data (e.g., metrology data) as target output. Training a machine learning model adjusts weights connecting input data to target output data. The machine learning model may output the weights connecting operation/step combinations to performance. The weights may be used in the TTTM analysis, as output by the machine learning model, as adjusted by a user, etc. In some embodiments, a partial least squares model may be used to generate the weight function. In some embodiments, a stacked partial least squares model may be used (e.g., a number of partial least squares models arranged as an ensemble model).

At block 532, processing logic performs operations of sensor contribution computation. In some embodiments, performance of operations of blocks 532 through 535 may be dependent upon the value of the TTTM index. For example, processing logic may be configured to perform further analysis (e.g., drill down analysis to search for root cause) if the TTTM index meets a threshold (e.g., below a threshold value established in configuration settings). At block 532, sensor contribution information may be generated that indicates "how much" of an outlier one or more data point is. Previous operations include labelling if a data point is within control limits. Sensor contribution values indicate how far outside control limits an outlier is. An exemplary sensor contribution metric is severity distance. Severity distance is a measure of how far outside control limits a data point (e.g., summary data point) is. Severity distance is indicative of a relationship between a data point (or an aggregation of data points) and an associated control range. In some embodiments, a severity distance may be generated for one or more sensor/operation data points for a manufacturing run (e.g., a single product). Severity distance may be based on one or more summary data (e.g., one or more types of summary data). In some embodiments, severity distance calculations may include a calculation of how far outside control limits one or more data points are. In some embodiments, severity distance calculations may include a calculation of how far outside control limits a data point is, relative to the size of the control range (e.g., a temperature sensor may be assigned a control range between 20 and 40 degrees, a data point of 50 degrees may be calculated to be 50% of the size of the control range above the upper control limit). For example, a data point below a lower control limit (e.g., lower than a control range) may have a severity distance calculated as $$SD = \frac{LCL - x}{UCL - LCL} \times w \times 100,$$

where SD is a severity distance, LCL and UCL are lower and upper control limits, x is the value of the data point (or aggregation of data points) in question, the denominator of the fraction calculates a control range, w is a weight factor, and 100 is used to convert the severity distance to a percent form. A corresponding formula may be used for data points above an upper control limit. Different calculations may be used for a sensor contribution computation—for example, a sensor contribution computation may depend on the square of the difference between a control limit and a data point value, to give further weight to data points farther outside control limits (e.g., a relationship steeper than linear between the sensor contribution and the difference between the data point and the control limit). Inlier points may be assigned a severity distance of zero. In some embodiments, severity distance may be related to distance away from the center (e.g., mean, or an ideal value not necessarily at the mathematical center) of a control range.

An aggregated metric value or index may be generated based on one or more severity distances. An example aggregated metric is severity score. Severity score may include an aggregation of severity distances for a number of process runs (e.g., of several products produced). The severity score may indicate a likelihood that a particular sensor/operation pair (e.g., a sensor measuring voltage applied to generate a plasma in a plasma etch processing operation) produces data over several runs indicative of a chamber fault, chamber drift, etc. Calculation of an aggregated severity distance, such as a severity score, may include a factor indicating the frequency of outlier data points. For example, a severity score may be calculated as $$SS = FF \times \sum_{r=1}^{q} SD,$$

where SS is a severity score, FF is a frequency factor, calculated by dividing the number of outliers in a set of data (e.g., for a particular sensor/operation pair over a number of runs) by the total number of data points in the set, r is an index of the processing runs, q is the number of processing runs to be included in the aggregation, and SD is a severity distance from run r (e.g., a severity distance associated with a sensor/operation pair for a single processing run). The severity score may represent how far outside expectations a sensor/operation pair is performing, over the course of several processes or runs (e.g., produced products). Similar metric values may be generated to produce complimentary data, for instance a similar metric to severity score which sums over sensors, instead of runs, may be used to indicate whether a particular operation was likely to be performed correctly for a particular product.

In some embodiments, metric values may be further aggregated to assist in analysis. For example, processing logic may aggregate severity scores (corresponding to a single sensor and single operation, in some embodiments) across recipe operations to find a severity index per sensor (e.g., by summing the product of operation weights and severity scores over the operations of a process). Such analysis may be triggered by severity score reaching a threshold value (e.g., a quality index, quality score, severity score, etc., satisfying a criteria), a number or portion of severity scores meeting one or more threshold values, etc. Triggering conditions to aggregate data to generate new indices may be stored as configuration settings. Aggregating severity scores in this manner may provide additional information into problematic or failing sensors. An analogous process may be performed, summing over sensors, to determine if one or more operation of a manufacturing process is performing sub-optimally. In some embodiments, TTTM indices (in some embodiments, associated with one run or product, and one processing operation) may be aggregated, e.g., by summing the product of a TTTM index (per run per operation, for example) and an operation weight over multiple operations (e.g., warm-up, etch, deposition, and cool-down operations) to generate a TTTM index per run. This may assist in determining if a particular operation of a manufacturing process is performing sub-optimally. Similar procedures may be carried out to isolate, for instance, faults tracing back to a single run (e.g., a single semiconductor wafer). Various aggregations of indices may be used by processing logic to recommend a component or subsystem be maintained or replaced, may be supplied as input to a machine learning model to generate corrective action recommendations, etc. Corrective actions may include scheduling preventative maintenance, updating a processing recipe, sending an alert to a user, etc. In some embodiments, clustering analysis may be performed on index and/or metric values. Clustering analysis is discussed in more detail in connection with FIG. 5H. Clustering visualization is discussed in more detail in connection with block 535.

At block 533, processing logic performs inlier drift detection. A method of inlier drift detection is described in detail in connection with FIG. 5I. TTTM index analysis, severity distance, severity score, etc., may be associated with outlier data. Inlier data (e.g., data within control limits) may also provide valuable information for analysis. Inlier analysis may be performed using summary data. In some embodiments, summary data from a run (e.g., one product, such as one semiconductor wafer) may be compared to golden summary data (e.g., summary data recording during production of a product meeting performance thresholds). In some embodiments, summary data from a series of manufacturing runs (e.g., a day of processing, a week, a month, etc.) may be compared to golden summary data from a series of manufacturing runs.

Comparisons between golden data and data to be analyzed may be performed using any technique for comparing data sets. In some embodiments, techniques for quantifying time series similarity may be utilized. One metric that may be used is to preprocess and/or clean the data such that each data point of the data set to be analyzed has a corresponding data point of the golden run data (e.g., data with the same time stamp, associated with the same processing operation, etc.). Differences between the values of corresponding data points may then be aggregated (e.g., sum their squares, sum their absolute values, etc.). The metric may be further processed, e.g., the square root taken of the summed squares, divided by the number of data points to normalize, etc. Higher values of the metric may indicate that two data sets are more dissimilar. In some embodiments, a discrete Fourier transform may be performed on both data sets, and corresponding Fourier coefficients may be compared in a similar manner to the above analysis comparing corresponding data points. In some embodiments, autoregressive models may be utilized to compare data sets. An autoregressive model is a representation of a random process, where values of data points of the process depend upon values of previous data points. An autoregressive model may be used to determine a likelihood that the data set to be analyzed and the golden data set are associated with the same process (e.g., processing conditions, chamber quality, etc., is the same between the two sets).

In some embodiments, an elastic dissimilarity measure may be utilized to determine a similarity value between the two data sets. In some embodiments, dynamic time warping may be utilized in inlier drift analysis. Dynamic time warping works by aligning or warping the data sets in the temporal domain so that the accumulated cost of the alignment is minimized. The cost function may be determined according to configuration settings. Elastic dissimilarity measures may be considered to adjust the spacing between data points in one data set to bring it into better alignment with the second data set. Elastic dissimilarity measures do not adjust the order of the data points, just the spacing between them. Elastic dissimilarity measures may return a metric value or index value indicative of how much spacing adjustment is performed to bring the two data sets into optimum alignment (as determined by, for instance, minimizing a cost function). In some embodiments, each point of a first data set may be associated with a point of the second data set after elastic warping. For example, data to be analyzed may be warped to bring it into optimal alignment with golden data. Each point of the data to be analyzed may be assigned a "nearest neighbor" point in the golden run data set after warping (e.g., several of the points of the analyzed set may be assigned the same nearest neighbor point of the golden data set). In some embodiments, each data point of both data sets may be linked to one or more closest neighbor points of the other data set. For example, each point of the warped data set being analyzed may be assigned a nearest neighbor point of the golden data set. This assignment may include some points of the golden data set being associated with multiple points of the data set to be analyzed. The assignment may also include some points of the golden data set not being assigned to any points in the analyzed data set as a nearest neighbor. Each data point in the golden set may then be assigned to a nearest neighbor point in the temporally warped data set to be analyzed. In a case where the two data sets are in alignment (e.g., the warping cost function is minimized when each of the data points 1 . . . n in the data set to be analyzed is closest neighbor to the corresponding point 1 . . . n of the golden data set), the number of closest neighbor associations may be equal to the number of data points in a set. In a case where the two data sets are significantly out of alignment, one or more points in each data set may have several points designated as nearest neighbors in the other data set. In this case, the number of closest neighbor associations may be higher than the number of data points in a set. The increased number of associations may be used as a metric (in some embodiments, with preprocessing, such as normalization, subtraction of the number of data points, etc.) indicating how much warping generates the optimum alignment of the two data sets. Inlier drift detection and elastic dissimilarity measures are discussed further in connection with FIG. 5I and FIGS. 6D-E.

In some embodiments, each tool, chamber, set of manufacturing equipment, etc., may operate somewhat differently. Each tool, chamber, set of equipment, etc., may have its own associated one or more golden data sets. Each type of process (e.g., each target product design, each recipe, etc.) may have its own associated one or more golden data sets.

Inlier drift detection operations may be used in performance of a corrective action. In some embodiments, and inlier drift detection metric above a certain threshold (in some embodiments, in accordance with configuration settings) may trigger a corrective action. Corrective actions may include providing an alert to a user, scheduling maintenance, updating a recipe, etc.

At block 534, additional features of the TTTM module may be utilized by processing logic for further analysis. Use of additional features may be in accordance with configuration settings. In some embodiments, values of various metrics may be used in determining if additional features are to be utilized. Additional features may aid in drill down analysis to isolate the cause of a chamber fault, drift, unexpected result, insufficient product quality, etc. Additional features may be used to determine a corrective action to be performed. Additional features may include providing data associated with a manufacturing process to one or more models (e.g., machine learning, physics-based, etc.) to provide additional analysis.

In some embodiments, additional features of the TTTM module may include trace data analysis, for example a trace data exploratory analysis module. Trace data analysis may include the use of a trained model (e.g., a machine learning model). In some embodiments, trace data analysis may be performed by providing trace data to a trained machine learning model, and receiving output from the machine learning model indicative of a corrective action, indicative of a component of equipment to be maintained or replaced, indicative of a fault in a subsystem of manufacturing equipment, etc. In some embodiments, trace data analysis may be performed using an autoencoder model. Autoencoder operation will be discussed in more detail in connection with FIG. 7. An example of visualizations associated with results of trace data analysis will be discussed in more detail in connection with FIGS. 6F-G.

Trace data analysis may include data preparation operations, e.g., data cleaning, reformatting, normalizing, interpolating, etc. Trace data may then be supplied to a trained model. The trained model may produce as output indications of sensors, subsystems, products, etc., that are not performing in an expected manner. In some embodiments, trace data associated with many (e.g., all) sensors associated with one product processed by the manufacturing equipment may be supplied to the trained model. A sequence of data associated with a sequence of products may be supplied to the trained model. The model may generate data indicating sub-optimal predicted product performance, metrology, properties, etc., based on trace data analysis of trace sensor data.

At block 535, processing logic performs results visualization operations. Any metrics, analyses, etc., performed or generated by the TTTM analysis process may be incorporated into one or more visualization procedures, in some embodiments processing logic may perform visualization operations in accordance with configuration settings. Indices, metrics, etc., may be visualized in any convenient or appropriate manner. For example, scatter plots, histograms, box plots, line plots, etc.

In some embodiments, data may be clustered for visualization. In some embodiments, severity distance may be utilized for clustering and visualization of outliers. Data of a number of runs and a number of sensors may be utilized for clustering and visualization. In some cases, a majority of sensor data will be inlier data (e.g., within control limits). Data may be preprocessed to remove superfluous data (e.g., all inlier data may be removed). In some embodiments, dimensional reduction may be applied to simplify the remaining outlier data. Dimensional reduction may aid in data visualization, e.g., reducing data to be of two or three dimensions for more convenient analysis. In some embodiments, a non-linear dimensionality reduction model may be utilized. A non-linear dimensionality reduction model may capture correlations that a linear dimensionality reduction model (e.g., principle component analysis) will not capture. The dimensionality reduction model may convert affinities or similarities between data points to probabilities that the data points are located close together (e.g., by Euclidian distance, Minkowski distance, a correlation distance, or another distance function) in the reduced dimensionality space. In some embodiments, the dimensionality reduction model may include a t-stochastic nearest neighbor embedding algorithm. In some embodiments, parameters controlling the operations of the dimensionality reduction model may be stored as configuration settings, such as perplexity (a metric determining the number of nearest neighbors expected in a cluster), distance metric in the high-dimensional space, etc.

In some embodiments, data that has been dimensionally reduced may be clustered using a clustering model. In some embodiments, a clustering model may be chosen that self-selects the number of clusters in the data set. In some embodiments, a density-based spatial clustering of applications with noise clustering algorithm may be utilized. Parameters determining details of operation of the clustering model may be stored as configuration settings (e.g., metrics affecting clustering distance, cluster size, distance metric, etc.).

In some embodiments, data points (e.g., clustered, dimensionally reduced outlier points) may have contributions to severity score (e.g., the severity distances of sensors contributing to the severity score associated with the outlier point) ranked. The top contributing sensors to a cluster (e.g., sensors represented in a number of data points in a cluster, sensors contributing to one cluster and not another, etc.) may be used to label the cluster. In some embodiments, sensors and their associated data may be assigned to a subsystem of manufacturing equipment (e.g., heater power subsystem, chamber temperature subsystem, chamber pressure subsystem, etc.). A cluster may be labeled by the subsystem(s) most heavily contributing to the outlier status of the points associated with the cluster. In this way, clusters may be grouped by root cause (e.g., subsystem failure). Outlier clustering may be used in performance of a corrective action, e.g., providing an alert to a user, scheduling maintenance, adjusting a process recipe, etc.

Processing logic may generate visualizations related to inlier drift detection. Results of an elastic dissimilarity measure model may be visualized. Shifts may be represented by scatter plots, bar graphs, line plots, etc., data point associations may be plotted on a data set 1 vs data set 2 plot, or other methods of visualizing inlier drift detection data may be used.

Processing logic may generate visualizations associated with abnormal trace detection. In some embodiments, sensors may be grouped into subsystems, and metrics describing deviations from expected sensor results may be aggregated into subsystem metrics. Subsystem analysis metrics may be displayed per subsystem per run (product produced), for example as a heat map.

In some embodiments, visualizations may be provided to a user as part of a graphical user interface. In some embodiments, additional data may be available via interaction with the graphical user interface by the user. In some embodiments, additional analysis may be performed based on a user's interaction with the graphical user interface. For example, a heat map displaying results of abnormal trace detection analysis may be based only on a single metric (per subsystem per run, for example), but upon selecting a data point of the visualization, more data (such as details of differences between the analyzed trace data and expected trace data, details of the output of a machine learning model, details of recommended corrective actions, etc.) may be displayed. In another example, a visualization tool may display a representation of a number of TTTM indices for a variety of tools, products, etc. A user may select a particular representation (e.g., one displaced from a group of other points) and additional analysis (e.g., inlier drift detection, abnormal trace detection, etc.) may be performed on data associated with that data point.

Figure 5E:
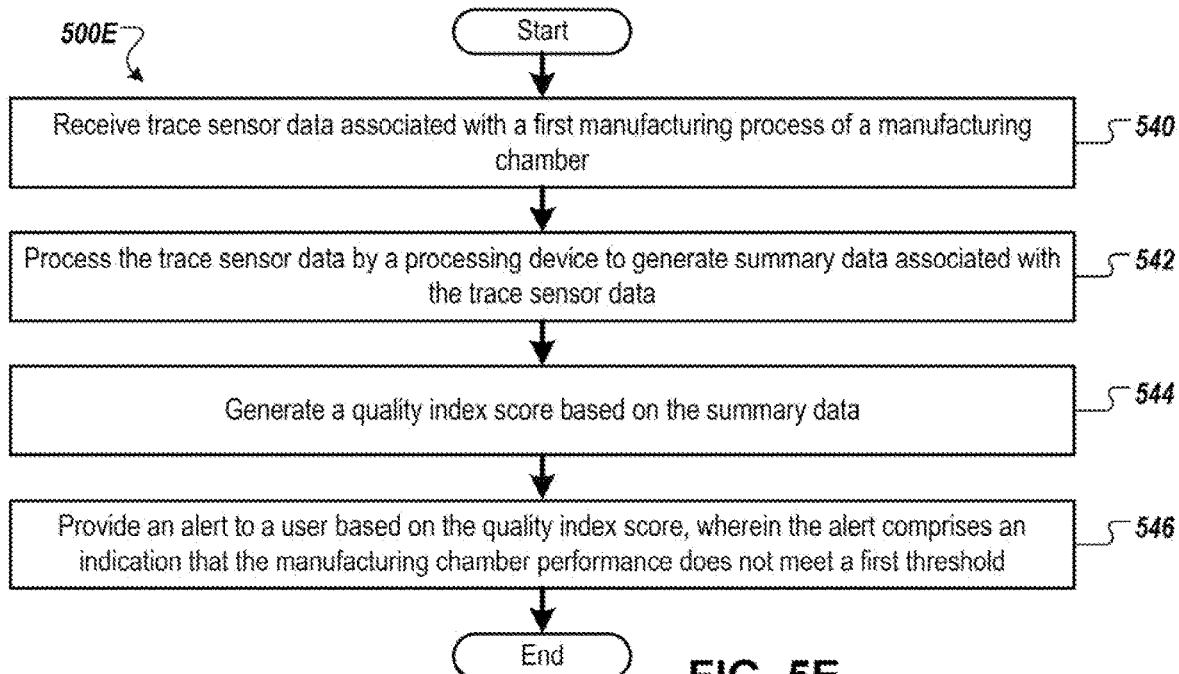
FIG. 5E is a flow diagram of a method 500E for causing performance of a corrective action based on a metric indicative of performance of a processing chamber, according to some embodiments.

FIG. 5E is a flow diagram of a method 500E for causing performance of a corrective action based on a metric indicative of performance of a processing chamber, according to some embodiments. At block 540, processing logic receives trace sensor data associated with a first manufacturing process of a manufacturing chamber. The trace sensor data may have been collected during processing of a product, such as a semiconductor wafer, by the manufacturing chamber.

At block 542, processing logic processes the trace sensor data to generate summary data associated with the trace sensor data. In some embodiments, generating summary data includes identifying at least one steady state portion and at least one transient portion of the trace sensor data. A transient portion includes a set of trace data associated with a period of time where property values in a chamber are changing (e.g., variance above a threshold). A steady state portion includes a set of trace data associated with a period of time where property values measured by the sensor are not changing (e.g., variance below a threshold). In some embodiments, a sliding window is utilized to distinguish a steady state portion from a transient portion. In some embodiments, determination of whether a set of data points (e.g., the points within a window) of trace sensor data belongs to a transient or steady state portion may include determining if a statistical measure (e.g., standard deviation) of the set of data points meets a threshold. A transient portion may include a set of points with a standard deviation above a threshold, and a steady state portion may include a set of points with a standard deviation below a threshold. Determining if a set of points belongs to a transient portion or a steady state portion may include consideration of a statistical measure of nearby (e.g., overlapping with the set) windows of data points. In some embodiments, a processing recipe includes a number of processing operations. In some embodiments, trace data from a sensor of a process operation (e.g., one or more process operations of a process recipe) may include a transient head (e.g., as conditions in a manufacturing chamber adjust to a set point), a steady state portion (e.g., as conditions are maintained at a set point), and a transient tail.

In some embodiments, summary data is generated for each portion (e.g., each steady state portion, each transient portion, etc.) separately. Summary data of a steady state portion may include statistical descriptions of the data, e.g., mean, maximum, minimum, range, standard deviation, kurtosis, etc. Summary data of a transient portion may include statistical descriptions. Summary data of a transient portion may further include metrics generated in view of the output of a digital twin model. A digital twin model of one or more components of a manufacturing chamber associated with one or more sensors may be generated (e.g., a sensor may measure power supplied to a component, and a digital twin model of the component and the power supply for the component may be built). The digital twin model may receive as input information indicative of a processing recipe (e.g., set points, proximate environment property values, etc.) and produce as output time trace data predicting sensor readings. In some embodiments, output of the digital twin model (e.g., simulated sensor data) may be compared to measured sensor data. In some embodiments, differences between features in simulated and measured sensor data (e.g., differences larger than a threshold) may be included in summary data of a transient portion. Features of the transient data may include metrics such as overshoot over a target or final value, rise time, settle time, parameters of detected oscillation, a difference between a set point and a final value, etc.

At block 544, a quality index score is generated based on the summary data. The quality index score may be associated with a particular run (e.g., a product produced by the manufacturing equipment), a process operation, a sensor, or some combination of these features (e.g., a quality index score may be associated with one sensor and one operation over multiple runs, a quality index score may be associated with a group of sensors such as all temperature sensors, etc.). In some embodiments, a quality index is generated that is indicative of the quality of a run and a processing operation. In some embodiments, generated quality indices may be used to perform actions to increase consistency of processing parameters between runs, between chambers, etc., e.g., tool to tool matching (TTTM).

In some embodiments, a quality index is generated in view of one or more classification conditions. In some embodiments, data (e.g., summary data) may be classified as inlier data or outlier data. In some embodiments, data may be classified as inlier data, low outlier data (e.g., below a lower control limit), or a high outlier data (e.g., above an upper control limit). Classification may be performed by comparing a data value to upper and lower control limits, e.g., to determine if the data value is within a control range, determine if data values meet a threshold, etc. Control limits may be assigned by a user, may be statistical in nature (e.g., three standard deviations away from the average of historical data), etc. In some embodiments, inliers may not contribute to a quality index score, and the quality index may be based only on outliers.

In some embodiments, a quality index is generated in view of a plurality of weighting factors. A weighting factor may represent the contribution of data to performance, e.g., contribution to properties of finished products. For example, in some processes, data from one sensor may be more strongly correlated to performance than data from another sensor. For such processes, data from a first sensor that is less strongly correlated to product performance may be given less weight in a quality index score calculation than data from a second sensor that is more strongly correlated to product performance. A weighting factor may be associated with a sensor, a process operation, a sensor/operation pair (e.g., a sensor measuring voltage supplied to a plasma-generation apparatus may be given high weight during a plasma operation and low or zero weight during an operation without plasma), a feature of the data (e.g., one aspect of summary data may be more correlated with product performance than another, one part of trace data may be more correlated with product performance than another, etc.), or the like. In some embodiments, weighting factors may be extracted from a trained machine learning model. A machine learning model may be trained to correlate process data (e.g., sensor data, summary sensor data, etc.) to performance data (e.g., metrology data). The machine learning model may be configured to map one or more relationships between sensor data and metrology data. Weighting factors may be extracted from the machine learning model (e.g., a stacked partial least squares model), may be determined in view of factors extracted from the machine learning model, may be calculated based on data including that extracted from the machine learning model (e.g., in addition to process knowledge), etc.

In some embodiments, a quality index score may be generated as an aggregation of calculated metrics. For example, a TTTM index score may be generated by aggregating data associated with many sensors (e.g., via a weighted sum) to calculate a quality index score indicative of the quality of one operation of one processing run (e.g., one product). Other index aggregations may also be applicable for a TTTM process, e.g., aggregating many runs to indicate quality of a process over time, aggregating over operations and sensors to provide a general quality value of a processing run, etc. Processing logic may generate many indices, and provide information (e.g., to a user, to further processing logic, etc.) associated with index values that may be indicative of a problem with manufacturing equipment (e.g., all index values that meet a threshold, a certain percentage or number of index values most likely to be associated with a problem or fault, etc.). Index values indicative of a problem or fault may be used to initiate further analysis, e.g., drill down analysis to determine root cause, a corrective action to be performed, etc.

In some embodiments, a quality index score may include information associated with how far outside a control range a data point is, e.g., a severity of an outlier. In some embodiments, a data point may be assigned a severity distance. Calculating a severity distance (e.g., a severity distance score) may include calculating how far outside a control range a data point is, for example as a fraction of the size of a control range (e.g., an outlier below a lower control range may have a severity distance which is calculated using a ratio between how far below the lower control limit the data point is, and the difference between the upper and lower control limit). Control limits and control ranges may be associated with a sensor, process operation, chamber, product design, etc. Calculation of a severity distance may include a weighting factor. A severity distance May be associated with a sensor, a process operation, and a processing run (e.g., product).

In some embodiments, severity distances may be aggregated (e.g., into a severity score). Aggregated severity distances scores may be used in drill down analysis. As an example, generating a severity score (e.g., aggregated severity distances) may include summing severity distances for a number of runs (e.g., to generate a severity score associated with a sensor and a process operation). In some embodiments, a severity score may include a factor related to how many points are outliers, e.g., a frequency (for example, a percent) of outlier points for each sensor and process operation.

In some embodiments, one or more metrics indicative of quality (e.g., a TTTM index, a severity score, etc.) may be provided to processing logic for visualization. In some embodiments, data points (e.g., severity distances) may be provided to a dimensionality reduction model. In some embodiments, the dimensionality reduction model may be a non-linear model, such as a t-stochastic nearest neighbor embedding model. In some embodiments, data points (e.g., dimensionally reduced severity distances) may be provided to a clustering model. In some embodiments, the clustering model may be a non-linear clustering model, such as a density-based spatial clustering of applications with noise model. In some embodiments, data points of a cluster may be assigned to a subsystem (e.g., based on the most significant contributions to the severity scores of the data points). In some embodiments, each cluster may be assigned a subsystem root cause of the manufacturing equipment.

At block 546, processing logic provides an alert to a user based on the quality index score, wherein the alert comprises an indication that the manufacturing chamber performance does not meet a first threshold. In some embodiments, a metric (such as a TTTM index score) may be provided to a user. In some embodiments, a visualization of metrics (e.g., a bar graph, histogram, box plot, etc.) may be provided to a user. In some embodiments, a visualization may be used by a user to initiate, inform, or continue drill down analysis, for example to identify a root cause of a fault or a corrective action to be performed.

Figure 5F:
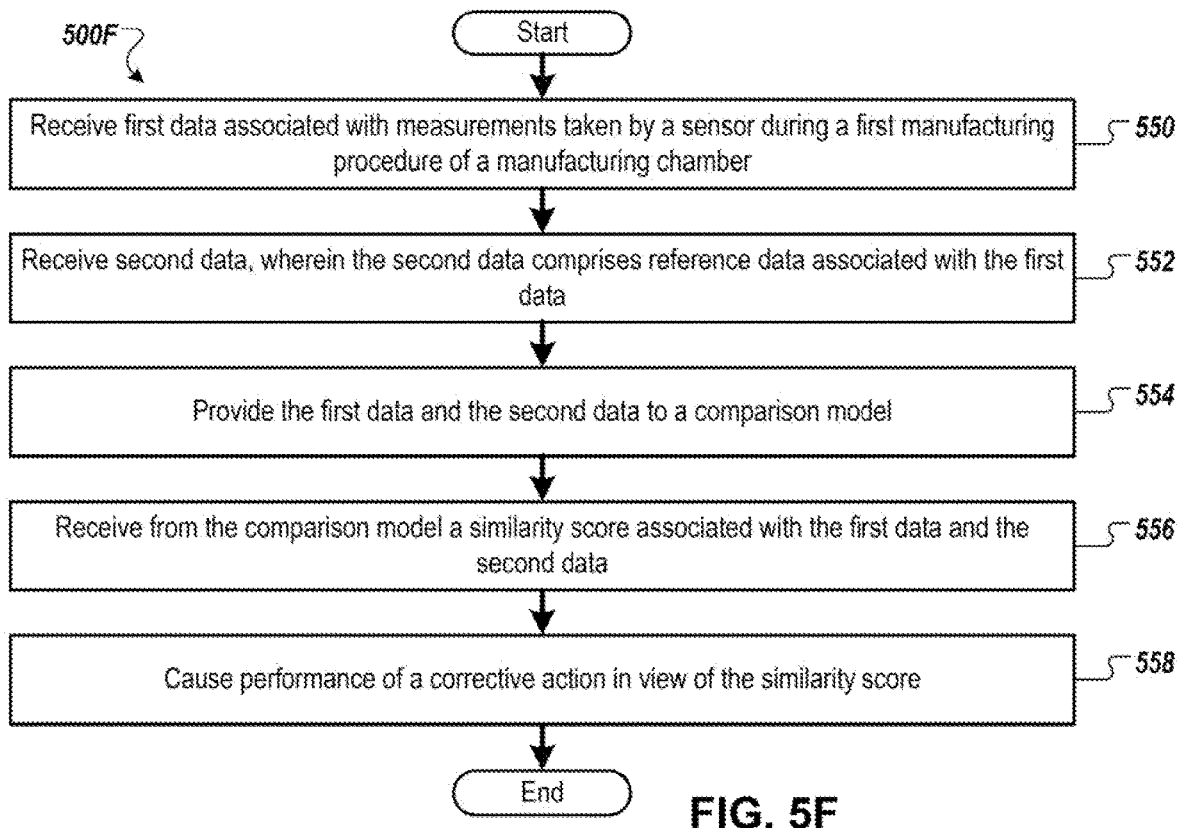
FIG. 5F is a flow diagram of a method for performing inlier analysis, according to some embodiments.

FIG. 5F is a flow diagram of a method 500F for performing inlier analysis, according to some embodiments. In one embodiment, method 500F is performed after method 500E is performed for data in which no outliers were identified. At block 550, processing logic receives first data associated with measurements taken by a sensor during a first manufacturing procedure of a manufacturing chamber. In some embodiments, the data may include summary data. The data may include inlier data points, where inlier data points are points that meet criteria (e.g., thresholds). At block 552, processing logic receives second data. The second data includes reference data associated with the first data. The reference data may be data associated with a process that produced an acceptable product, a process wherein acceptable conditions were achieved, etc. Reference data may be referred to as golden data. Reference data may be associated with the same process, sensors, chamber, equipment, etc., as the first data.

At block 554, the first data and the reference data (e.g., golden run data) are provided to a comparison model. In some embodiments, the comparison model is an elastic dissimilarity model, e.g., a model that manipulates the space between data points of two data sets without changing their order to achieve the closest match possible. In some embodiments, the comparison model may be a dynamic time warping model. In some embodiments, data (e.g., summary data) over a number of processing runs (e.g., days, weeks, or more of product manufacturing) may be provided to the comparison model. A metric may be provided (e.g., by the elastic dissimilarity model) indicative of how different the measured and golden data are. For example, the model may note the best match between each data point of both data sets with a data point of the opposite set. Two identical data sets may have the same number of matched pairs as there are points in one data set. Two sets that are not well matched may have a larger number of pairs. The metric may be related to the number of pairs matched between the two sets, e.g., related to the ratio of data points to matched pairs.

At block 556, processing logic receives from the comparison model a similarity score associated with the first data and the reference data. In some embodiments, the similarity score is related to a number of matched pairs between the two data sets. At block 558, processing logic causes performance of a corrective action in view of the similarity score. The corrective action may include sending an alert to a user. The alert may include a visualization, e.g., a visualization of a number of similarity scores, a visualization of the closest point matching between the two sets of data, etc. The corrective action may include scheduling maintenance, either preventative or corrective. The corrective action may include updating a process recipe.

Figure 5G:
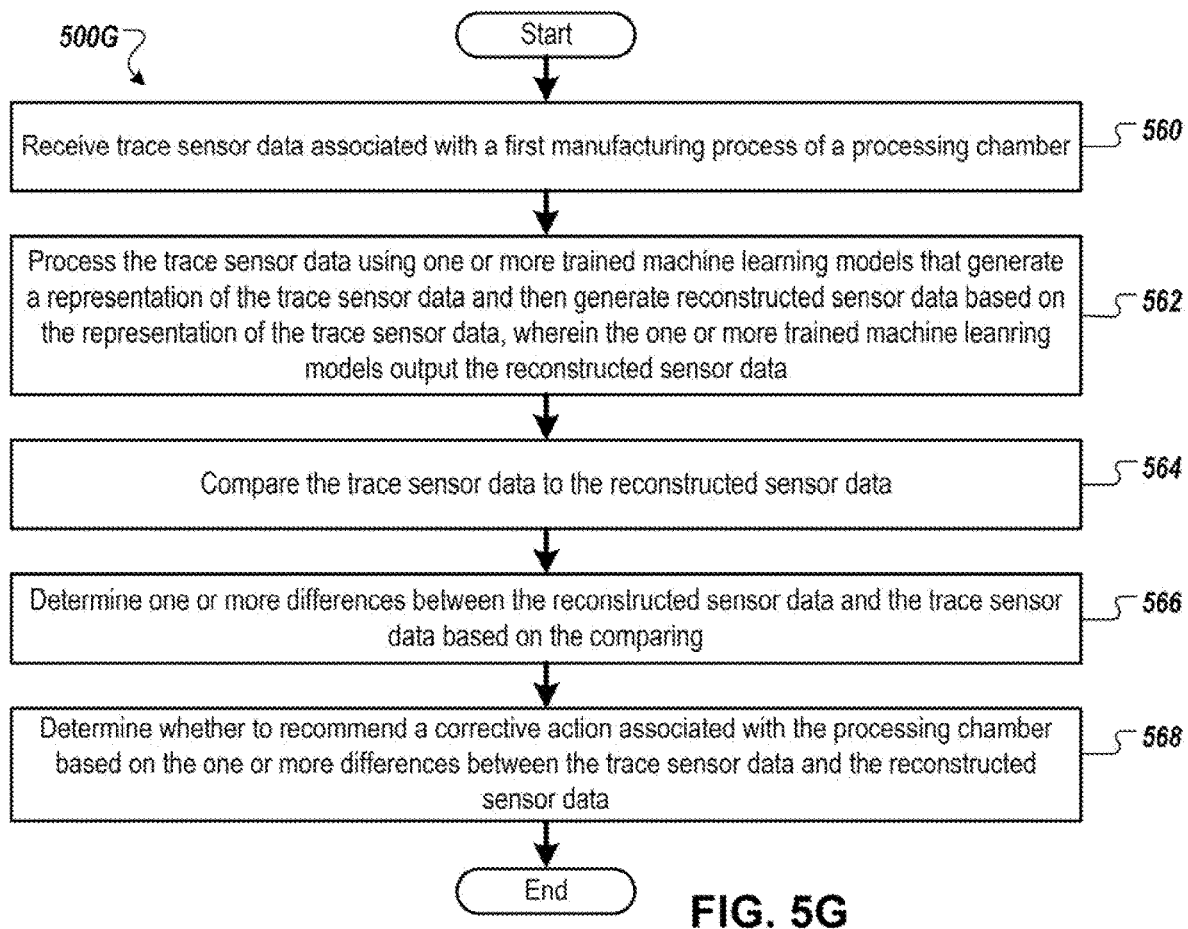
FIG. 5G is a flow diagram of a method for performing trace sensor data analysis, according to some embodiments.

FIG. 5G is a flow diagram of method 500G for performing trace sensor data analysis, according to some embodiments. At block 560, processing logic receives trace sensor data associated with a first manufacturing process of a processing chamber. In some embodiments, processing logic may be provided the trace data responsive to the values of one or more metrics meeting a threshold. For example, a TTTM index may meet a threshold. Responsive to the index meeting the threshold (e.g., satisfying a criterion), trace data associated with the TTTM index (e.g., trace data from a sensor with a high severity score) may be further analyzed. In some embodiments, the processing logic performs preprocessing on the trace data. Preprocessing may include smoothing, cleaning (e.g., resizing, removing empty data, etc.), interpolation, etc.

At block 562, processing logic processes the trace sensor data using one or more trained machine learning models. The trained machine learning models are trained to generate a representation of the trace sensor data (e.g., a reduced dimensionality representation). The one or more trained machine learning models are trained to reconstruct sensor data based on the representation of the trace sensor data. The one or more trained machine learning models output the reconstructed data. In some embodiments, trace sensor data may be provided to an autoencoder model. In some embodiments, trace sensor data may be provided to a trained encoder model to generate the representation of the trace sensor data. The representation may then be provided to a trained decoder model to generate reconstructed sensor data. An autoencoder model may be an encoder-decoder model. In some embodiments, the machine learning model may be trained by providing data (e.g., preprocessed sensor trace data) to the model. The model may be configured to generate a representation of the input data (e.g., a dimensionally reduced representation). The model may be configured to generate reconstructed data from the representation of the input data. The model may then be trained by minimizing (subject to configuration settings, for example to avoid making no changes to trace sensor data to generate the representation) differences between input data and reconstructed data.

At block 564, processing logic compares the trace sensor data to the reconstructed sensor data. In some embodiments, the machine learning model was trained using data meeting a threshold, e.g., data within control limits, data a specified portion of which is within control limits, data associated with processes wherein products meeting performance thresholds were produced, golden run data, etc. The trace sensor data provided to the trained machine learning model may or may not be associated with an irregular processing run, e.g., a processing run with data outside control limits.

At block 566, processing logic determines one or more differences between the reconstructed sensor data and the trace sensor data. The differences may be determined based on the comparison performed in association with block 564. In some embodiments, the trace sensor data may be in some way different than the training data, e.g., the trace sensor data may be associated with a processing run that did not produce an acceptable product, the trace sensor data may be outside one or more control limits, etc. The differences between the training set and the trace sensor data may cause the trace sensor data and the reconstructed data to be significantly different. A reconstruction error may be used to determine if input data is significantly outside the scope of the training data. Since the machine learning model was trained using data from a healthy tool (e.g., a tool that has relatively new parts and that produces product that meets quality criteria), the machine learning model generates an accurate recreation of the trace data when the trace data is from a healthy tool. However, when the reconstructed data differs from the trace data, this is an indication that the trace data somehow deviates from that of a healthy tool. In some embodiments, the reconstruction errors (e.g., error in each data point of the trace data) may be aggregated, for example, to generate a metric of error associated with a sensor and a processing run (e.g., one product).

At block 568, processing logic determines whether to recommend a corrective action associated with the processing chamber. The determination may be based on the one or more differences between the trace sensor data and the reconstructed sensor data. The determination may be based on the aggregated error metric. In some embodiments, sensors may be associated with a subsystem. Error metrics may be further aggregated (e.g., as root mean squared error) into subsystems. In some embodiments, a visualization may be generated. The visualization may be organized by run, by subsystem, by sensor, etc.

Figure 5H:
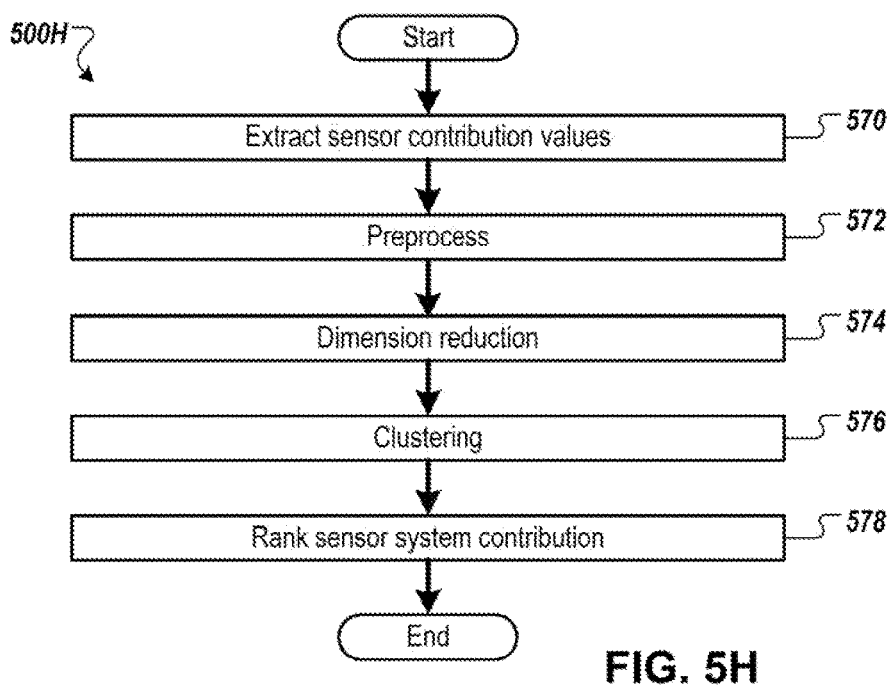
FIG. 5H is a flow diagram of a method for performing outlier clustering analysis, according to some embodiments.

FIG. 5H is a flow diagram of method 500H for performing outlier clustering analysis, according to some embodiments. Triggering of outlier clustering and details of the processing may be in accordance with configuration settings. In some embodiments, outlier clustering may be triggered by a number of outlier points in an earlier analysis meeting a threshold value. At block 570, sensor contribution values are extracted by processing logic. Sensor contribution calculations are discussed in more detail in connection with block 532 of FIG. 5D. In some embodiments, each sensor contribution index (e.g., severity index, severity distance, severity score, or the like) utilized for clustering may be associated with a single run and sensor. In some embodiments, a number of data points (e.g., from a number of sensors over a number of processing runs) may be analyzed using clustering methods. Due to a high number of sensors associated with a tool, this data may occupy a high dimensional space. In some embodiments, the majority of the data will be inlier data, e.g., data within control limits. In some embodiments, sensor contribution values of inliers may be defined as zero. In some embodiments, only data points with sensor contribution values that meet a threshold may be utilized for clustering analysis.

At block 572, data preprocessing for clustering analysis is performed. Data preprocessing may include cleaning the data set, e.g., to only include runs that have sensors exhibiting outlier behavior. Other preprocessing may be performed, including normalization, etc. At block 574, dimension reduction operations are performed by a processing device. In some embodiments, the high dimensional data set may be reduced to a space more easily visualized for increased analytic power, to accommodate a clustering model, etc. In some embodiments, the data set may be reduced to a two-dimensional data set. In some embodiments, an algorithm that is likely to place data points that are close together in the high dimensional space, close together in the low dimensional space. Closeness may be determined by Euclidian distance, cosine distance, or other distance metrics. In some embodiments, a non-linear dimension reduction model may be used. In some embodiments, t-stochastic nearest neighbor embedding methods may be used for dimensionality reduction. Dimensionality reduction may be performed in accordance with configuration settings, e.g., distance metric, expected number of nearest neighbors, etc.

At block 576, clustering operations are performed by a processing device. Clustering operations may be performed upon data that has been reframed in a low dimensional space. In some embodiments, a clustering model may be utilized that self-selects the number of clusters in the data. In some embodiments, a density-based spatial clustering of applications with noise method may be utilized for clustering operations. Clustering may identify a number of sets of data points which are represented close together in the low dimensional space, indicating a high probability that the data points were represented close together in the high dimensional space. Such data points are likely to be related to the same root cause. Clustering operations may be performed in accordance with configuration settings. Configuration settings may include a distance metric, an minimum number of samples in a cluster, a maximum distance between two samples for them to be considered neighbors, etc.

At block 578, processing logic ranks sensor system contributions to one or more clusters, according to some embodiments. Data points of a cluster may be analyzed by examining the sensor contribution values contributing to the data point. In some embodiments, the sensors associated with a data point may be ordered by a sensor contribution value (e.g., severity distance). In some embodiments, sensors with the highest contribution (e.g., the three sensors with the highest contribution values) may be utilized to assign a primary subsystem of a manufacturing system to a data points, to a cluster, etc. In some embodiments, clustering results may be visualized by processing logic. Outlier clustering visualization is discussed in more detail in connection with block 535 of FIG. 5D and FIG. 6C.

Figure 5I:
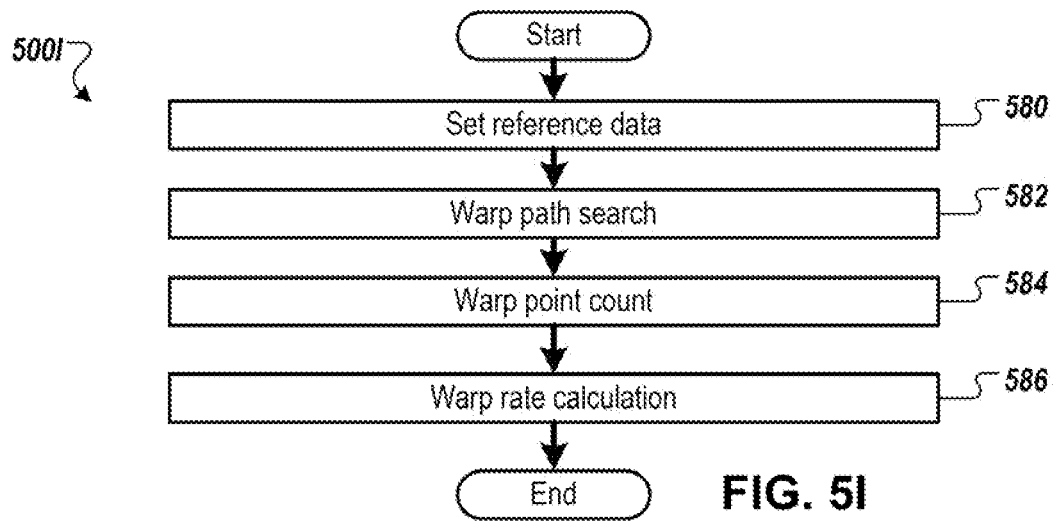
FIG. 5I is a flow diagram of a method for performing inlier drift detection, according to some embodiments.

FIG. 5I is a flow diagram of a method 500I for performing inlier drift detection, according to some embodiments. Inlier drift detection may be triggered and/or performed subject to configuration settings. Some operations of a TTTM analysis module utilize outlier data points (e.g., TTTM indexing, sensor contribution/severity metrics, etc.). In some embodiments, analysis of inlier data points (e.g., data points within control limits) may be used to determine system faults, drift, corrective actions to be performed, etc.

At block 580, reference data is set for inlier drift detection. In some embodiments, inlier drift detection includes comparing data (e.g., data collected over a period of time) to reference data. In some embodiments, a golden data set is provided or selected. A golden data set may include data from a processing run associated with a product manufactured within specifications. A golden data set may include data from a processing run performed soon after a successful installation of a tool or preventative maintenance.

At block 582, a warp path search is conducted. In some embodiments, inlier drift detection includes use of an elastic dissimilarity model. Such a model alters the space between data points of a data set (without changing the order of the data points) to generate the optimal match between the two sets, e.g., as measured by summing the difference between data values (or interpolations of data values) of the two sets. In some embodiments, a dynamic time warping algorithm is applied to the reference data set and a data set to be analyzed. In some embodiments, the data sets include summary data. In some embodiments, the data sets include summary data collected over a span of time, e.g., many processing runs. A warp path determines how to stretch one data set (e.g., the data to be analyzed) to match the pattern of the other data set (e.g., golden data).

At block 584, warp point count is determined. Warp point count is a metric to indicate how far a data set must be warped to provide a best match with another data set. Other metrics may also be used to indicate the degree of warping, such as an aggregated measure of how far data points of one set must be shifted. Warp point count is a measure of how many matched pairs of comparison points between the two data sets exist. In some embodiments, each point of the target data set (e.g., the data set being analyzed) is matched to one "closest neighbor" point of the reference data set (e.g., golden data set). In some embodiments, each point of the reference data set is matched to one closest neighbor point of the target data set. If the two data sets are well aligned, each data point of a set may be matched to one other data point of the opposite set, and the number of matches is the same as the number of data points. If the two data sets are not well aligned, some data points of one or both sets may be matched to multiple points of the opposite set, and the number of matches may be larger than the number of data points. Matching point count may be extended to situations where reference data and target data have a different number of data points. In some embodiments, since each data point will have at least one matched point, a count of matching points may have the number of data points (e.g., number of guaranteed matches) removed, leaving only the number of additional matches due to warping of one data set, e.g., warp point count. At block 586, a warp rate calculation is performed by processing logic. Warp rate is a comparison indicating how warped a data set is overall (e.g., corrected for the size of the data set). In some embodiments, warp rate may be calculated as $$WR = \frac{\text{Warp Point Count}}{\text{Total Matching Point Count}} \times 100,$$

where WR is a warp rate, and 100 is used to transform the warp rate calculation to a percent. In some embodiments, a corresponding similarity rate may be calculated, e.g., 100% minus the warp rate. In some embodiments, a corrective action may be triggered based on a similarity rate or warp rate. In some embodiments, a corrective actions may be triggered based on whether a similarity rate, warp rate, etc., meets a threshold. The corrective action may include sending an alert to a user, performing additional drill down analysis, updating a recipe, scheduling maintenance, etc.

FIGS. 6A-G depict example visualizations associated with aspects of TTTM analysis, according to some embodiments. FIG. 6A depicts a visualization 600A of operations for splitting a trace into transient and steady-state portions, according to some embodiments. Visualization 600A includes a time trace 602. Time trace 602 may be associated with one sensor and one processing operation (e.g., a full run time trace has already been split, such as by operation splitter 451 of FIG. 4C, to generate time trace 602). Window 604 is utilized to determine if a set of data points (e.g., the data points within the window) belong to a transient or steady state portion of the data. A metric value of points within the window may be used to classify the points in the window as transient or steady state. In some embodiments, if the standard deviation of points in the window is above a threshold, the points of the window are determined to be of a transient portion.

In some embodiments, window 604 is moved through the time trace to classify data points of the trace as transient or steady state, as indicated by the arrow and dashed window at the right side of trace 602. In some embodiments, time trace 602 may be separated into two or more portions. In some embodiments, time trace 602 may be separated into a transient head portion 606, a steady state portion 607, and a transient tail portion 608.

Figure 6B:
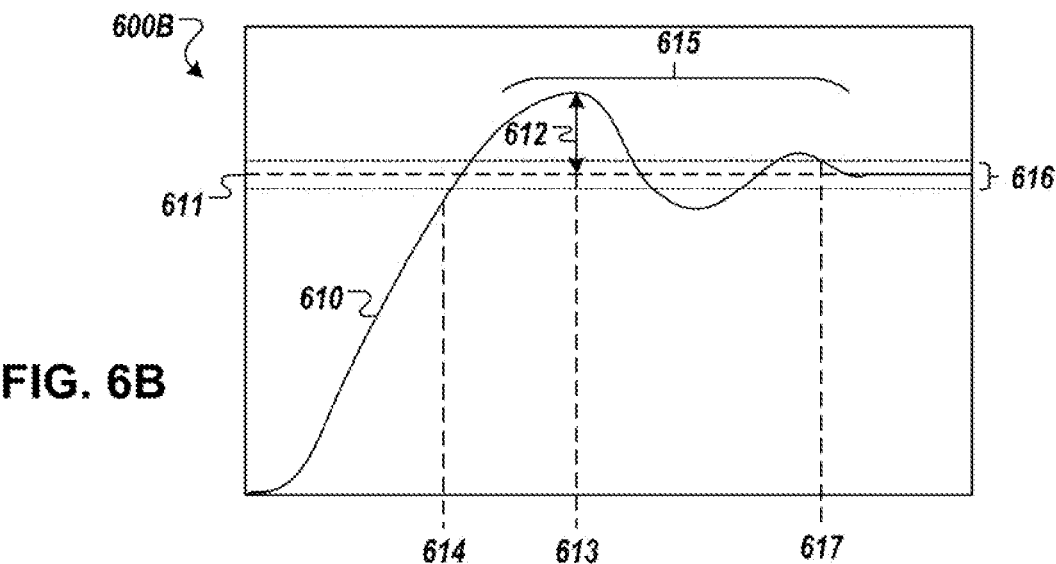
FIG. 6B depicts a visualization of digital twin output used for summary data generation operations, according to some embodiments.

FIG. 6B depicts a visualization 600B of digital twin output used for summary data generation operations, according to some embodiments. One or more components of manufacturing equipment may be modeled by a digital twin. A digital twin includes a digital recreation of one or more physical assets. Using the digital twin, system response (e.g., to control adjustment to meet a set point) may be modeled. Various features of the digital twin response may be compared to sensor data to generate summary data.

Visualization 600B includes time trace 610. In some embodiments, time trace 610 may be associated with the transient part of a processing operation. The digital twin model may include target set point 611, associated with a property value measured by a sensor in the physical manufacturing system. Features of the digital twin time trace include overshoot 612. Time trace 610 may exceed a set point (or, in some embodiments, drop below a set point) before settling to the set point value. One or more of the value of the overshoot 612 (or a normalized or otherwise processed version thereof) or peak time 613 may be utilized to generate summary data. In some embodiments, rise time 614 may be used to generate summary data. In some embodiments, rise time 614 may be measured at the first time when time trace 610 meets set point 611. In some embodiments, rise time 614 may be measured at the first time when time trace 610 reaches a threshold (e.g., 80% of the difference between the set point and the starting value, as shown in visualization 600B).

In some embodiments, a period of oscillation, such as oscillation 615, may be utilized to generate summary data. Properties such as oscillation frequency, amplitude, etc., may be used to generate summary data. A settle time 617 (e.g., a time for time trace 610 to remain within an error window 616 of set point 611) may be used to generate summary data. In some embodiments, a set point error (e.g., the difference between the final value of time trace 610 and set point 611) may be used to generate summary data.

Figure 6C:
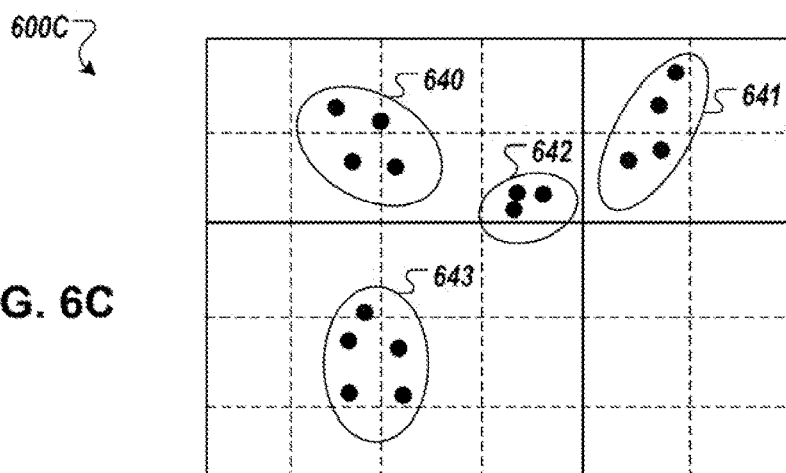
FIG. 6C depicts a visualization of clustering operation results, according to some embodiments.

FIG. 6C depicts a visualization of clustering operation results, such as those discussed in connection with FIG. 5H, according to some embodiments. Outlier data points (e.g., data points indicating unusual or sub-optimal performance) may be used in clustering operations. Clustering operations may be directed at identifying a root cause (e.g., subsystem) responsible for outlier data (e.g., responsible for sub-optimal performance of manufacturing equipment). In some embodiments, high dimensional sensor data is transformed to a low dimensional space, e.g., by a dimensional reduction model. In some embodiments, the high dimensional space is reduced to a two-dimensional space. In some embodiments, a dimensional reduction algorithm places points that were close together (e.g., by Euclidian distance, by cosine distance, etc.) in the high dimensional space close together in the low dimensional space. In some embodiments, data points with the same (or related) root cause (e.g., a subsystem causing the data point to be an outlier) may be represented close together in the low dimensional space. In some embodiments, sensor contribution to data points may be used to assign a subsystem to a cluster.

Visualization 600C depicts outlier points in a low dimensional space. A clustering algorithm (e.g., a density-based spatial clustering application) may be used to separate data points into groups that are likely to be related to the same root cause. Exemplary visualization 600C is separated into four clusters 640, 641, 642, and 643. Top contributing sensors (e.g., sensors with the highest severity metric) of each cluster may be used to label each cluster with a manufacturing subsystem. For example, cluster 640 may be found to be associated with the heater power subsystem, cluster 642 may be found to be associated with electrostatic chuck temperature, cluster 643 may be found to be associated with gas flow in some part of the manufacturing system, etc.

Figure 6D:
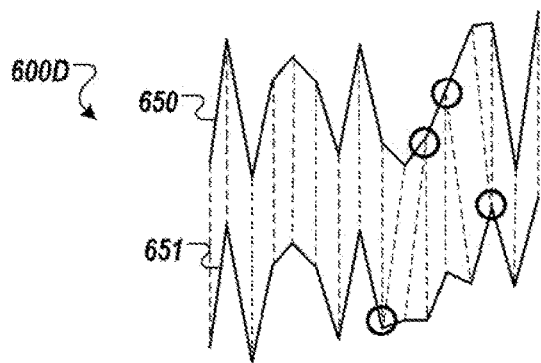
FIG. 6D depicts the results of an elastic dissimilarity model applied to a reference time trace and a similar target time trace.
Figure 6E:
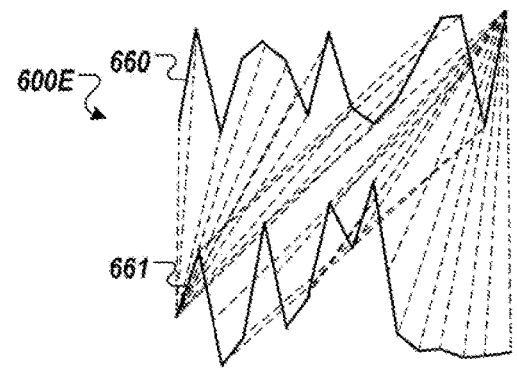
FIG. 6E depicts the results of an elastic dissimilarity model applied to a reference time trace and a dissimilar target time trace.

FIGS. 6D-E depict visualizations of inlier drift detection elastic dissimilarity model results, according to some embodiments. FIG. 6D depicts the results of an elastic dissimilarity model 600D applied to a target time trace 650 and reference time trace 651. Shown in FIG. 6D (and FIG. 6E) are the original sequential data, e.g., summary data collected over a number of processing runs, with the results of warping (e.g., application of the elastic dissimilarity model) shown by the dashed lines indicating pairs of matched points. Results 600D are generated from two traces that are quite similar. As highlighted by the circles, only a few points in either trace are matched to multiple points in the opposite trace, and in each case the number of matching points is small. Target trace 650 and reference trace 651 are temporally similar, indicated by the fairly ordered (e.g., primarily parallel) dashed lines.

FIG. 6E depicts the results of an elastic dissimilarity model 600E applied to a target time trace 660 and reference time trace 661 which are more dissimilar than those depicted in FIG. 6D. Many metrics may be used to quantify the degree of warping of target trace 660, e.g., to trigger a corrective action. Results 600E include several data points which are matched with a large number of points in the opposite trace. One method of indicating how much warping is associated with a pair of time traces includes comparing the number of matches that would exist in a well-matched pair of traces to the number of matches that exist in the analysis. Other methods include characterizing aggregated displacement of matches in time (e.g., how stretched left-to-right the dashed lines of FIG. 6E are), an indication of the slopes of matching lines, etc.

Figure 6F:
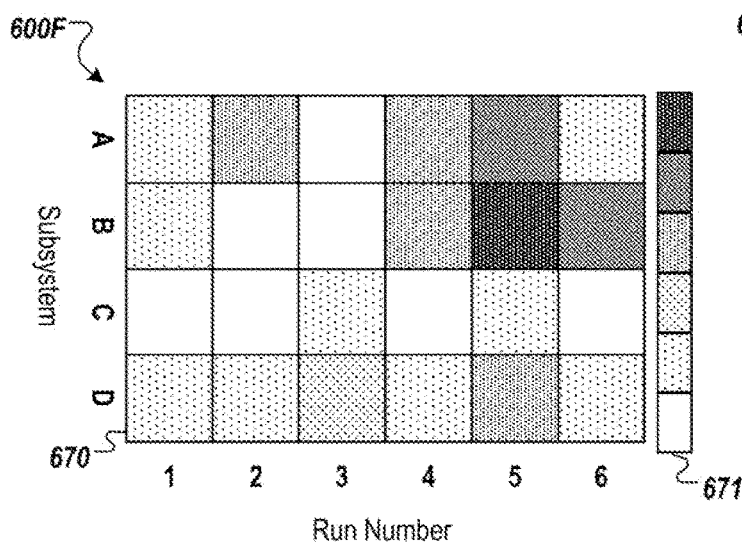
FIGS. 6F-G depict example visualizations of results of trace data analysis, according to some embodiments.
Figure 6G:
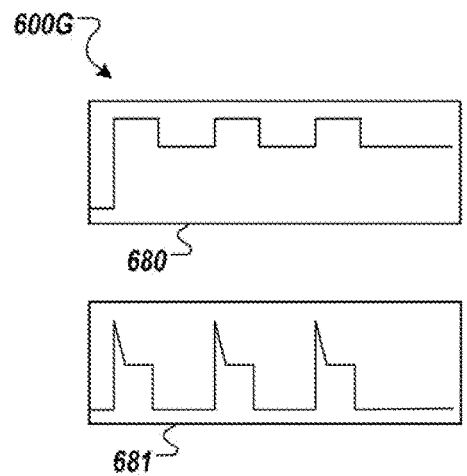

FIGS. 6F-G depict example visualizations 600F and 600G of results of trace data analysis, according to some embodiments. FIG. 6F includes heat map 670 and legend 671. Reconstruction error of an autoencoder model may have been utilized to generate heat map 670. In some embodiments, reconstruction error (e.g., related to the difference between input data and reconstructed data at each time stamp of a time trace) may be aggregated into a single error number for each trace. In some embodiments, reconstruction error may be further aggregated by sensor subsystem. In some embodiments, a single value may be generated for one processing run and one manufacturing subsystem. Heat map 670 may be generated from a number of subsystems (e.g., subsystems A, B, C, and D, such as vacuum subsystem, temperature subsystem, chucking subsystem, etc.) and a number of processing runs (e.g., substrates produced). Legend 671 may indicate visually subsystem/run pairs with high reconstruction error, e.g., subsystem/run pairs likely to have performed sub-optimally. Example visualization 600F depicts a particularly high reconstruction error associated with run number 5, subsystem B. In some embodiments, visualization 600F may be generated as a corrective action, e.g., may be considered an alert provided to a user. In some embodiments, visualizations such as visualization 600F may be used in performance of a corrective action, e.g., visualization 600F may indicate that maintenance on subsystem B is appropriate.

FIG. 6G depicts an example visualization 600G of output from an autoencoder model associated with trace data analysis, according to some embodiments. Visualization 600G includes input data pattern 680 and reconstructed data pattern 681. In some embodiments, visualization 600G may be generated (or displayed to a user) responsive to detecting high reconstruction error, e.g., may be generated (or displayed) responsive to a high reconstruction error being detected in a heat map visualization such as FIG. 6F. In some embodiments, a user may choose to see more details of a portion of a visualization associated with time trace analysis (e.g., by clicking the portion of heat map 670 associated with subsystem B and processing run 5), and a more detailed view (e.g., visualization 600G) may be displayed. In some embodiments, sub-optimal performance may be associated with high reconstruction error, e.g., large differences between input trace data patter 680 and reconstructed data pattern 681, as depicted in visualization 600G.

Figure 7:
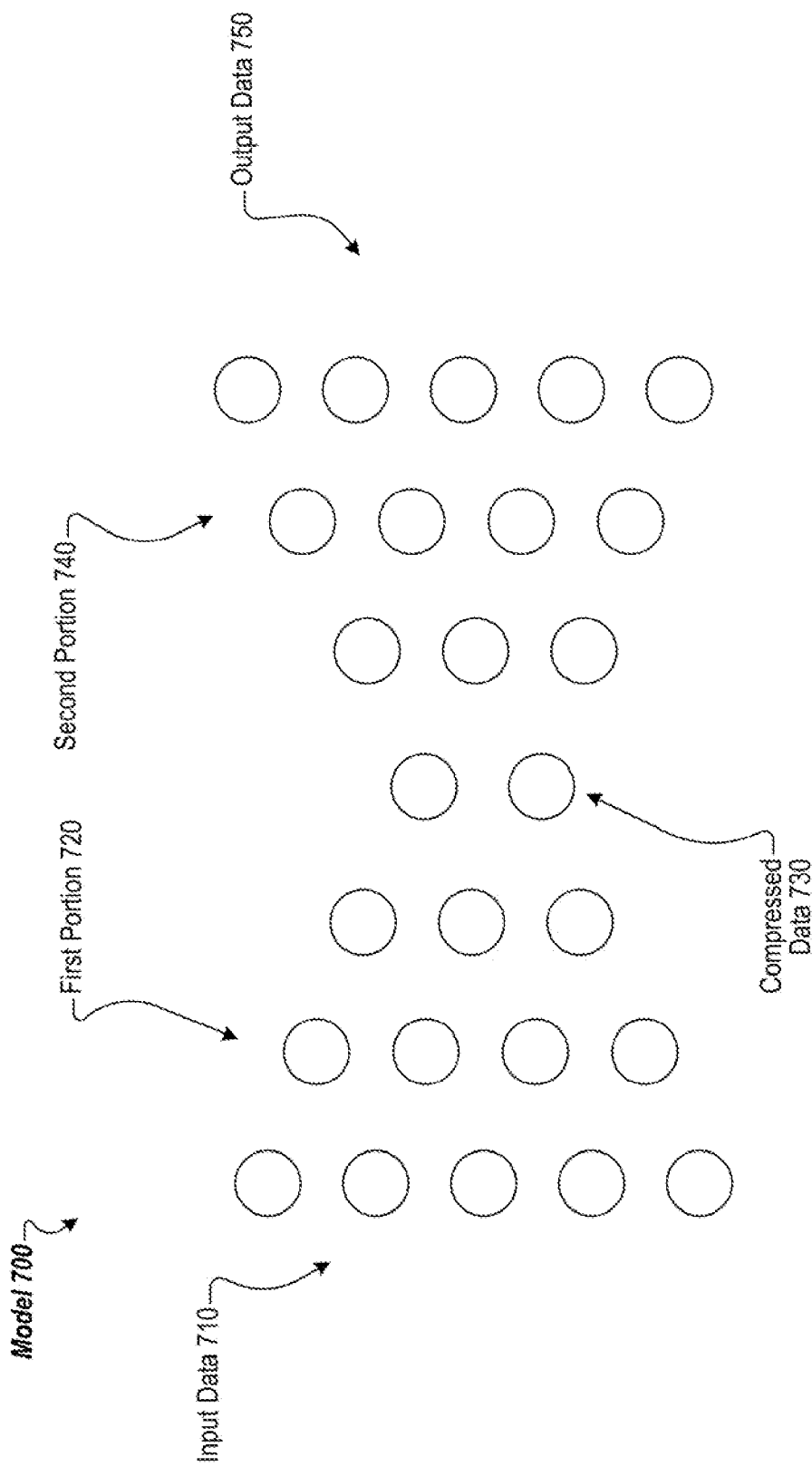
FIG. 7 is a diagram of the operations of a model that is capable of reducing the dimensionality of input data, according to some embodiments.

FIG. 7 is a diagram of the operations of a model 700 (e.g., machine learning model) that is capable of reducing the dimensionality of input data, e.g., an autoencoder model, according to some embodiments.

Input data 710 of model 700 is data associated with production of a substrate. In some embodiments, input data 710 includes one or more of metrology data, manufacturing parameters, sensor data, or combinations thereof. Input data 710 may be pre-processed data. In some embodiments, input data 710 is metrology data associated with a substrate. Metrology data can be of any (or many) types, including thickness, in-plane displacement, chemical characteristics, optical characteristics, etc. In some embodiments, input data 710 includes trace sensor data associated with product manufacturing, and/or preprocessed versions of trace sensor data.

Model 700 includes a first portion 720 (e.g., an encoder) and a second portion 740 (e.g., decoder). In some embodiments, the model is one or more of an autoencoder, a neural network model, a convolutional neural network model, a deep belief network, a feedforward neural network, a multilayer neural network, etc. The first portion 720 dimensionally reduces the input data 710 (e.g., metrology data) to a compressed form (e.g., compressed data 730). The input layer of the machine learning model may be separated from the compressed data by a number of hidden layers (two are depicted in FIG. 7, but any number of hidden layers may be used). During training of the machine learning model 700, the first portion 720 may generate one or more functions to fit input data 710 to a lower dimensional representation without guidance from a user. The reducing (e.g., compressing, encoding) may take place over several stages (i.e. convert input data 710 to partially compressed data first, then further to compressed data 730), or reducing (e.g., compressing, encoding) may be done in a single stage.

Second portion 740 takes as input compressed data 730 and produces output data 750. During training, model 700 is trained to minimize the difference between input data 710 and output data 750, where output 750 is a reconstruction of input data 710 from compressed data 730. The minimization function used to train model 700 may also enforce penalties on the dimensionality of compressed data 730, to avoid returning a function with insufficient compression (e.g., the identity function, which perfectly recreates input data 710 but does not compress the data to a reduced dimensionality). Model 700 may be trained such that the output data 750 of model 700 approximately matches input data 710.

The function(s) utilized by the first portion 720 and the second portion 740 may be non-linear in nature. All processes of model 700 (i.e., both reduction and reconstruction, both encoding and decoding, etc.) may be used in some applications. In other applications, only some capabilities may be utilized. For example, while training, model 700 may pass input data 710 through first portion 720 to form compressed data 730, then through second portion 740 to determine output data 750, which is then compared to input data 710 to determine the output data 750 is substantially similar to the input data 710.

In some embodiments, model 700 may be utilized for abnormal trace analysis. Model 700 may be trained on historical data. The historical training data may be restricted to successful runs, e.g., runs wherein produced products' properties were within a threshold, runs wherein chamber conditions achieved were within a threshold, etc. Model 700 may then be configured to generate compressed data for future successful manufacturing runs. In some embodiments, model 700 may be trained and utilized for data associated with one (or a limited number) set of equipment, recipe, product design, etc.

Model 700 may produce output data 750 with some reconstruction error (e.g., differences from input data 710). In some embodiments, input data 710 that is in some way similar to training input used to train model 700 may generate output data 750 with relatively low reconstruction error. A reconstruction error index (e.g., a sum of errors from data point to data point, squared errors, normalized sums, root mean squared error, etc.) may be generated to represent a metric of the total reconstruction error of a data set input into model 700. In some embodiments, the magnitude of the error index may indicate a similarity between input data 710 and the data used to train model 700. In some embodiments, a high reconstruction error (e.g., substantial differences exist between output data 750 (reconstructed data generated from compressed data 730) may indicate that input data 710 is substantially different than the data used to train model 700. In some embodiments, model 700 is trained strictly on "good" data (e.g., data associated with manufacturing runs meeting performance thresholds), and a large reconstruction error index may indicate that input data 710 is sub-optimal. Reconstruction error may be calculated per run (e.g., per produced product), per sensor, per tool, per subsystem, etc., and may be visualized in a convenient format for facilitating performance of a corrective action.

Figure 8:
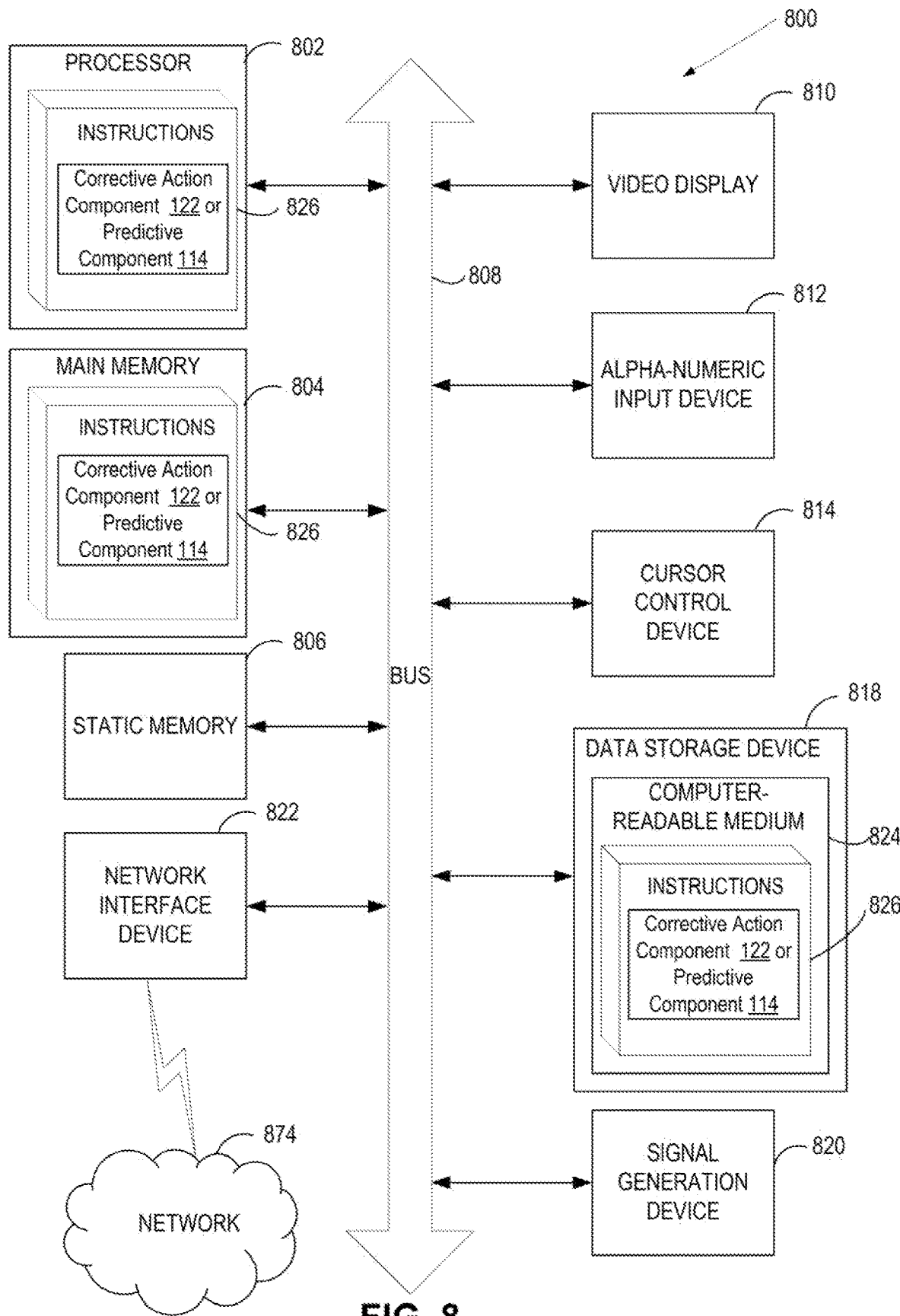
FIG. 8 is a block diagram illustrating a computer system, according to some embodiments.

FIG. 8 is a block diagram illustrating a computer system 800, according to certain embodiments. In some embodiments, computer system 800 may be connected (e.g., via a network, such as a Local Area Network (LAN), an intranet, an extranet, or the Internet) to other computer systems. Computer system 800 may operate in the capacity of a server or a client computer in a client-server environment, or as a peer computer in a peer-to-peer or distributed network environment. Computer system 800 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 800 may include a processing device 802, a volatile memory 804 (e.g., Random Access Memory (RAM)), a non-volatile memory 806 (e.g., Read-Only Memory (ROM) or Electrically-Erasable Programmable ROM (EEPROM)), and a data storage device 818, which may communicate with each other via a bus 808.

Processing device 802 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 800 may further include a network interface device 822 (e.g., coupled to network 874). Computer system 800 also may include a video display unit 810 (e.g., an LCD), an alphanumeric input device 812 (e.g., a keyboard), a cursor control device 814 (e.g., a mouse), and a signal generation device 820.

In some embodiments, data storage device 818 may include a non-transitory computer-readable storage medium 824 (e.g., non-transitory machine-readable medium) on which may store instructions 826 encoding any one or more of the methods or functions described herein, including instructions encoding components of FIG. 1 (e.g., predictive component 114, corrective action component 122, model 190, etc.) and for implementing methods described herein.

Instructions 826 may also reside, completely or partially, within volatile memory 804 and/or within processing device 802 during execution thereof by computer system 800, hence, volatile memory 804 and processing device 802 may also constitute machine-readable storage media.

While computer-readable storage medium 824 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," "reducing," "generating," "correcting," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

What is claimed is:

1. A method, comprising:
obtaining sensor data during a first manufacturing procedure of a manufacturing chamber;
generating summary data based on the sensor data, the generating the summary data comprising:
identifying a steady state portion of the sensor data and generating a first portion of the summary data based on the steady state portion, and
identifying a transient portion of the sensor data and generating a second portion of the summary data based at least in part on one or more differences between the transient portion and predicted data associated with the transient portion;
receiving reference data, wherein the reference data comprises data associated with the sensor data;
providing the summary data and the reference data to a comparison model;
receiving from the comparison model a similarity score associated with the summary data and the reference data; and
causing performance of a corrective action in view of the similarity score.

2. The method of claim 1, wherein:
generating the first portion of the summary data based on the steady state portion comprises calculating statistical data from the steady state portion.

3. The method of claim 1, wherein the predicted data associated with the transient portion comprises output of a digital twin model of one or more components of the manufacturing chamber.

4. The method of claim 1, wherein the comparison model comprises a dynamic time warping model.

5. The method of claim 4, wherein the similarity score is based on a sum of a number of matching pairs of points between the summary data and the reference data, as determined by the dynamic time warping model.

6. The method of claim 1, wherein values of the summary data are within a control range.

7. The method of claim 1, wherein the corrective action comprises one or more of:
sending an alert to a user;
scheduling preventative maintenance; or
scheduling corrective maintenance.

8. A system comprising non-transitory memory and a processing device coupled to the non-transitory memory, wherein the processing device is configured to:
obtain sensor data during a first manufacturing procedure of a manufacturing chamber;
generate summary data based on the sensor data, generating the summary data comprising:
identifying a steady state portion of the sensor data and generating a first portion of the summary data based on the steady state portion, and
identifying a transient portion of the sensor data and generating a second portion of the summary data based at least in part on one or more differences between the transient portion and predicted data associated with the transient portion;
receive reference data, wherein the reference data comprises data associated with the sensor data;
provide the summary data and the reference data to a comparison model;
receive from the comparison model a similarity score associated with the summary data and the reference data; and
cause performance of a corrective action in view of the similarity score.

9. The system of claim 8, wherein:
generating the first portion of the summary data based on the steady state portion comprises calculating statistical data from the steady state portion.

10. The system of claim 8, wherein the predicted data associated with the transient portion comprises output of a digital twin model of one or more components of the manufacturing chamber.

11. The system of claim 8, wherein the comparison model comprises a dynamic time warping model.

12. The system of claim 11, wherein the similarity score is based on a sum of a number of matching pairs of points between the summary data and the reference data, as determined by the dynamic time warping model.

13. The system of claim 8, wherein values of the summary data are within a control range.

14. The system of claim 8, wherein the corrective action comprises one or more of:
sending an alert to a user;
scheduling preventative maintenance; or
scheduling corrective maintenance.

15. A non-transitory machine-readable storage medium storing instructions which, when executed, cause a processing device to perform operations comprising:
- obtaining sensor data during a first manufacturing procedure of a manufacturing chamber;
- generating summary data based on the sensor data, generating the summary data comprising:
  - identifying a steady state portion of the sensor data and generating a first portion of the summary data based on the steady state portion, and
  - identifying a transient portion of the sensor data and generating a second portion of the summary data based at least in part on one or more differences between the transient portion and predicted data associated with the transient portion;
- receiving reference data, wherein the reference data comprises data associated with the sensor data;
- providing the summary data and the reference data to a comparison model;
- receiving from the comparison model a similarity score associated with the summary data and the reference data; and
- causing performance of a corrective action in view of the similarity score.

16. The non-transitory machine-readable storage medium of claim 15, wherein:
- generating the first portion of the summary data based on the steady state portion comprises calculating statistical data from the steady state portion.

17. The non-transitory machine-readable storage medium of claim 15, wherein values of the summary data are within a control range.

* * * * *